US007356838B2

(12) United States Patent
Madison et al.

(10) Patent No.: US 7,356,838 B2
(45) Date of Patent: Apr. 8, 2008

(54) SYSTEM AND METHOD FOR CONTROLLING ACCESS TO DIGITAL CONTENT, INCLUDING STREAMING MEDIA

(75) Inventors: Justin Madison, Richardson, TX (US); Anthony Rodiger, The Colony, TX (US); Ajay Chintala, Addison, TX (US); Alan S. Florschuetz, Allen, TX (US)

(73) Assignee: Yahoo! Inc., Sunnyvale, CA (US)

( * ) Notice: Subject to any disclaimer, the term of this patent is extended or adjusted under 35 U.S.C. 154(b) by 651 days.

(21) Appl. No.: 10/692,444

(22) Filed: Oct. 22, 2003

(65) Prior Publication Data

US 2004/0162787 A1  Aug. 19, 2004

Related U.S. Application Data

(63) Continuation-in-part of application No. 10/416,623, filed as application No. PCT/US01/46726 on Nov. 5, 2001, which is a continuation of application No. PCT/US01/18324, filed on Jun. 6, 2001.

(51) Int. Cl.
*H04L 29/00* (2006.01)
*H04L 9/32* (2006.01)
(52) U.S. Cl. .......................................... 726/10; 726/21
(58) Field of Classification Search .................... 726/9, 726/10, 21
See application file for complete search history.

(56) References Cited

U.S. PATENT DOCUMENTS 5,715,403 A    2/1998 Stefik
5,949,876 A    9/1999 Ginter et al.
6,032,260 A    2/2000 Sasmazel et al.
6,158,005 A    12/2000 Bharathan et al.
6,223,292 B1   4/2001 Dean et al.
6,260,027 B1   7/2001 Takahashi et al.

(Continued)

FOREIGN PATENT DOCUMENTS

EP    0 862 104 A2    9/1998

(Continued)

OTHER PUBLICATIONS

International Search Report (PCT/US01/18324).

(Continued)

*Primary Examiner*—Matthew Smithers
(74) *Attorney, Agent, or Firm*—James J. DeCarlo; Greenberg Traurig LLP

(57) ABSTRACT

A system and method for controlling access to digital content, including streaming media. The system includes a web server, media server and end user processor, such as a personal computer, coupled to a network. The web server cryptographically generates a ticket in response to an end user's request for access to a file. The ticket is based, at least in part, on a time at or near when the ticket is generated. The media server generates an authorization ticket, preferably using the same cryptographic algorithm as the web server. The media server authorization ticket is based, at least in part, on a time at or near when the media server receives the request for access to the file. The media server determines whether to grant access to the file by comparing the ticket, as generated by the web server, to the ticket, as generated by the media server.

37 Claims, 12 Drawing Sheets

U.S. PATENT DOCUMENTS

| | | | |
|---|---|---|---|
| 6,263,432 | B1 | 7/2001 | Sasmazel et al. |
| 6,324,650 | B1 | 11/2001 | Ogilvie |
| 6,343,302 | B1 | 1/2002 | Graham |
| 6,353,812 | B2 | 3/2002 | Frankel et al. |
| 6,487,659 | B1 | 11/2002 | Kigo et al. |
| 6,516,412 | B2 | 2/2003 | Wasilewski et al. |
| 6,523,069 | B1 | 2/2003 | Luczycki et al. |
| 6,714,921 | B2 | 3/2004 | Pirolli et al. |
| 7,089,585 | B1 * | 8/2006 | Dharmarajan .................. 726/8 |
| 2002/0004903 | A1 | 1/2002 | Kamperman et al. |
| 2002/0007452 | A1 | 1/2002 | Traw et al. |
| 2002/0147929 | A1 | 10/2002 | Rose |
| 2003/0069829 | A1 | 4/2003 | Gathman et al. |
| 2004/0015703 | A1 | 1/2004 | Madison et al. |
| 2004/0030643 | A1 | 2/2004 | Madison et al. |
| 2004/0172396 | A1 * | 9/2004 | Vanska et al. ................. 707/9 |
| 2006/0085642 | A1 * | 4/2006 | Multerer et al. ............ 713/168 |

FOREIGN PATENT DOCUMENTS

| | | |
|---|---|---|
| EP | 0 998 091 A2 | 5/2000 |
| EP | 1 016 960 A1 | 7/2000 |
| JP | 05-333775 | 12/1993 |
| JP | 08-076994 | 3/1996 |
| JP | 11-031130 | 2/1999 |
| JP | 11-032037 | 2/1999 |
| JP | 11-225143 | 8/1999 |
| JP | 2000187646 A | 7/2000 |
| JP | 2000242602 A | 9/2000 |
| JP | 2001-034467 | 2/2001 |
| JP | WO 03/096199 | 11/2003 |
| WO | WO 00/58859 A | 10/2000 |
| WO | WO 01/26291 A2 | 4/2001 |
| WO | WO 02/099640 A1 | 12/2002 |
| WO | WO 02/099716 A1 | 12/2002 |
| WO | WO 2005/048029 A2 | 5/2005 |

OTHER PUBLICATIONS

International Preliminary Examination Report (PCT/US01/18324).
Supplementary European Search Report EP 01 94 2006.
Fritz Bauspeiss, Frank Damm, "Requirements for Cryptographic Hash Functions" Computers & Security, 11 (1992) pp. 427-437.
Joon S. Park, Ravi Sandhu, "Secure Cookies in the Web" Jul.-Aug. 2000 pp. 36-44.
International Search Report (PCT/US01/46726).
International Preliminary Examination Report (PCT/US01/46726).
Supplementary European Search Report EP 01 99 0856.
Japanese Office Action (JP 2003-502687), Jul. 19, 2007.

* cited by examiner

SYSTEM AND METHOD FOR CONTROLLING ACCESS TO DIGITAL CONTENT, INCLUDING STREAMING MEDIA

CROSS REFERENCE TO RELATED APPLICATIONS

This application is a continuation-in-part of U.S. application Ser. No. 10/416,623 filed on May 12, 2003 for SYSTEM AND METHOD FOR CONTROLLING ACCESS TO DIGITAL CONTENT, INCLUDING STREAMING MEDIA, which is based on International Application Serial No. PCT/US01/46726, filed on Nov. 5, 2001, for SYSTEM AND METHOD FOR CONTROLLING ACCESS TO DIGITAL CONTENT, INCLUDING STREAMING MEDIA, which is a continuation-in-part of International Application Serial No. PCT/US01/18324, filed Jun. 6, 2001, for SYSTEM AND METHOD FOR CONTROLLING ACCESS TO DIGITAL CONTENT, INCLUDING STREAMING MEDIA, all of which are hereby incorporated by reference herein.

BACKGROUND OF THE INVENTION

1. Field of the Invention

The present invention relates generally to controlling access to digital content and, more particularly, to ticket-based systems and methods for limiting access to streaming media.

2. Description of Related Art

With the advent of the Internet and the World Wide Web, an industry has developed around the delivery of digital content, such as streaming media content. By way of example, streaming media may be used for any of a number of purposes, including entertainment, distance learning and corporate purposes. Entertainment companies stream movies and sporting events, distance learning companies stream educational content, and corporations stream training materials.

With many such uses of streaming media, controlling access to the content is imperative. For example, entertainment companies may charge end users for each viewing of an item of streaming media, referred to in the entertainment vernacular as "pay-per-view." Similarly, distance learning companies charge students for access to on-line educational courses, and thus for access to streaming media. Corporate content is often confidential, and thus also requires controlled access.

Accordingly, systems have been developed to limit access to streaming media. The current industry standard for limiting access to streaming content involves the streaming media server authenticating end users before providing the streaming media content. More specifically, the streaming media server typically includes a software plug-in of compiled code that contains the logic for determining whether or not to grant access to the streaming media. Such an authentication plug-in, however, is often complicated and difficult to develop and maintain. For example, if the need arises to change to logic for granting access to the streaming media content, altering the compiled plug-in on the streaming media server is difficult. Furthermore, with all of the logic residing at the streaming media server, the streaming media server must have direct access to a database or distributed message passing service. Moreover, even in instances where validates a particular end user as being authorized to access the streaming media content, such end user is often able to circumvent the authorization process by sharing its access with unauthorized end users. Such sharing of access may take many forms, including the sharing of usernames and passwords of links to the content. Similar problems exist with systems used for controlling access to other forms of digital content. Accordingly, a need exists for an improved system and method for controlling access to digital content, particularly streaming media content, and authorizing end users.

SUMMARY OF THE INVENTION

The present inventions solves this and other needs by providing a system and method for controlling access to digital content, such as audio, visual, video, textual and streaming media. One system and method according to the present invention controls access to streaming media and includes a web server, media server and end user processor, such as a personal computer, coupled to a network.

In operation, the web server cryptographically generates a ticket in response to an end user's request for access to a file. The ticket is based, at least in part, on a time at or near when the ticket is generated. In certain embodiments, the ticket is based on additional information, including, for example, a security time interval, or an identifier of the end user.

Prior to a media server providing access to the requested file, the media server generates an authorization ticket, preferably using the same cryptographic algorithm as the web server. The media server authorization ticket is based, at least in part, on a time at or near when the media server receives the request for access to the file. The media server determines whether to grant access to the file by comparing the ticket, as generated by the web server, to the ticket, as generated by the media server.

In one embodiment, if the tickets do not match, then the time at which the web server generated the ticket differs from the time at which the media server generated the ticket by more than a predetermined amount, and the ticket can be logically thought to have "expired." Accordingly, the media server does not grant access to the media content. If the tickets match, then the tickets were generated within an authorized time interval, and the media server grants the end user access to the requested media content.

DETAILED DESCRIPTION OF PREFERRED EMBODIMENTS

Figure 1:
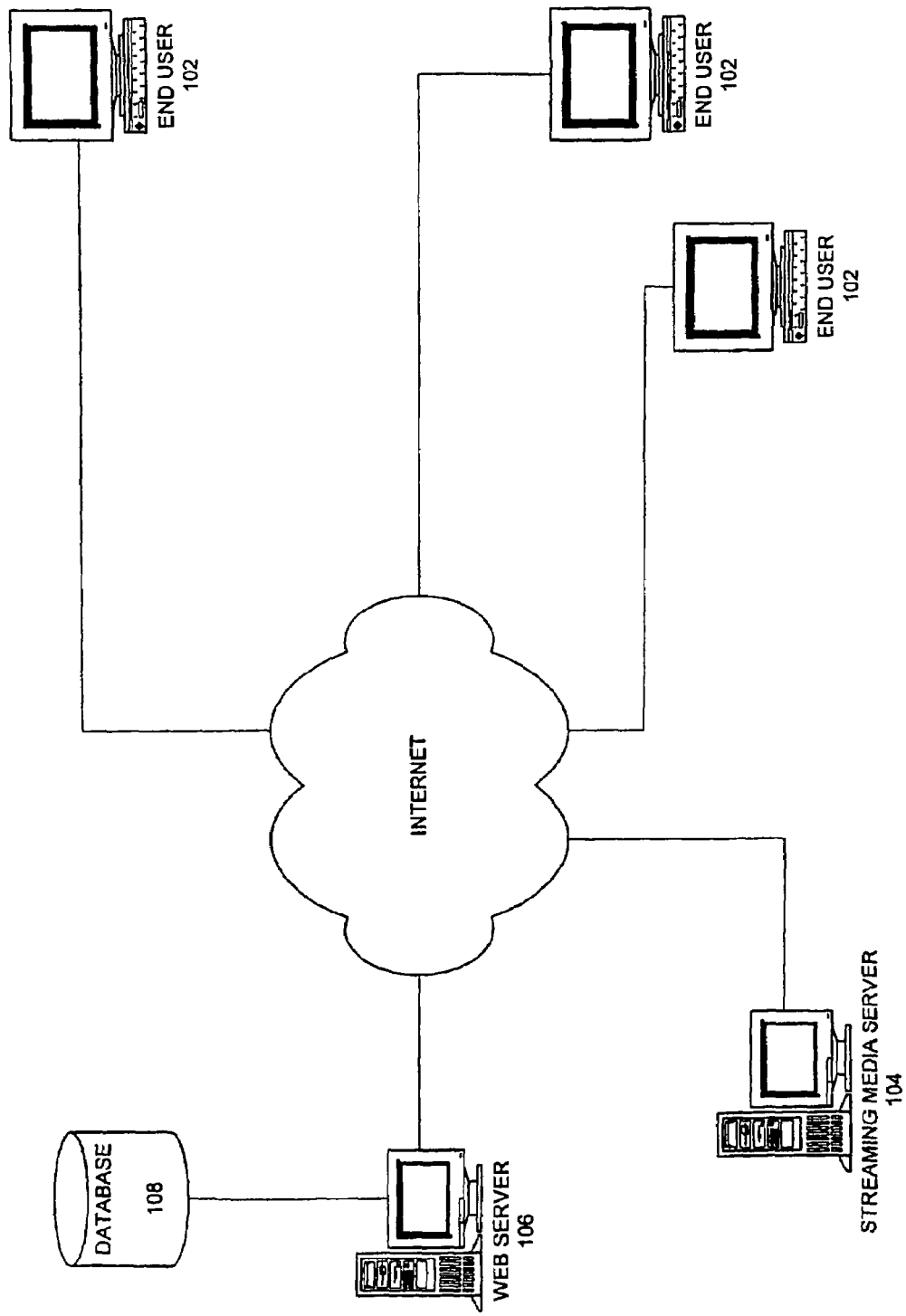
FIG. 1 is a schematic illustrating the system according to one embodiment of the present invention.

Certain preferred embodiments of the present invention will now be described with reference to the drawings. Although the invention for controlling access to content is described in the context of controlling access to streaming media files, it is to be understood that the present invention is applicable to all types of media or files. Furthermore, one skilled in the art will recognize that although the embodiments discussed herein relate to on-demand streaming media, the present embodiment is also applicable to live streaming media.

In general, the system of the present embodiment includes end user processors 102, a streaming media server 104 and a web server 106 having a content management (CM) database 108, all of which are coupled to the Internet. The end user processors 102 include an Internet browser, such as that provided by the Microsoft Corporation under the name INTERNET EXPLORER or provided by America Online Inc.'s Netscape Communications under the name NETSCAPE NAVIGATOR, and a streaming media player, such as that provided by the Microsoft Corporation under the name WINDOWS MEDIA PLAYER or that provided by Real Networks, Inc. under the name REALPLAYER. The web server 106, provides a website accessible by the end users 102. The website, in turn, includes links that can be activated by the end users 102 for accessing streaming media content residing on the streaming media server 104.

It is to be understood that the present invention may be implemented utilizing any number of computer technologies. For example, although the present embodiments relate to providing access to content via the Internet, the present invention may be utilized over any computer network, including, for example, a wide area network. Similarly, the end user processors 102 may be any device that may be coupled to the network, including, for example, personal digital assistants, web-enabled cellular telephones, hard-wired telephones that dial into the network, mobile computers, personal computers, Internet appliances and the like. Furthermore, the servers described herein may be of any type, running any software, and the software modules, objects and plug-ins described herein may be written in any programming language. Lastly, the database and storage devices described herein may utilize any storage technology, including, for example, local computer memory, network attached storage, and any known storage medium, such as magnetic or optical.

Figure 2:
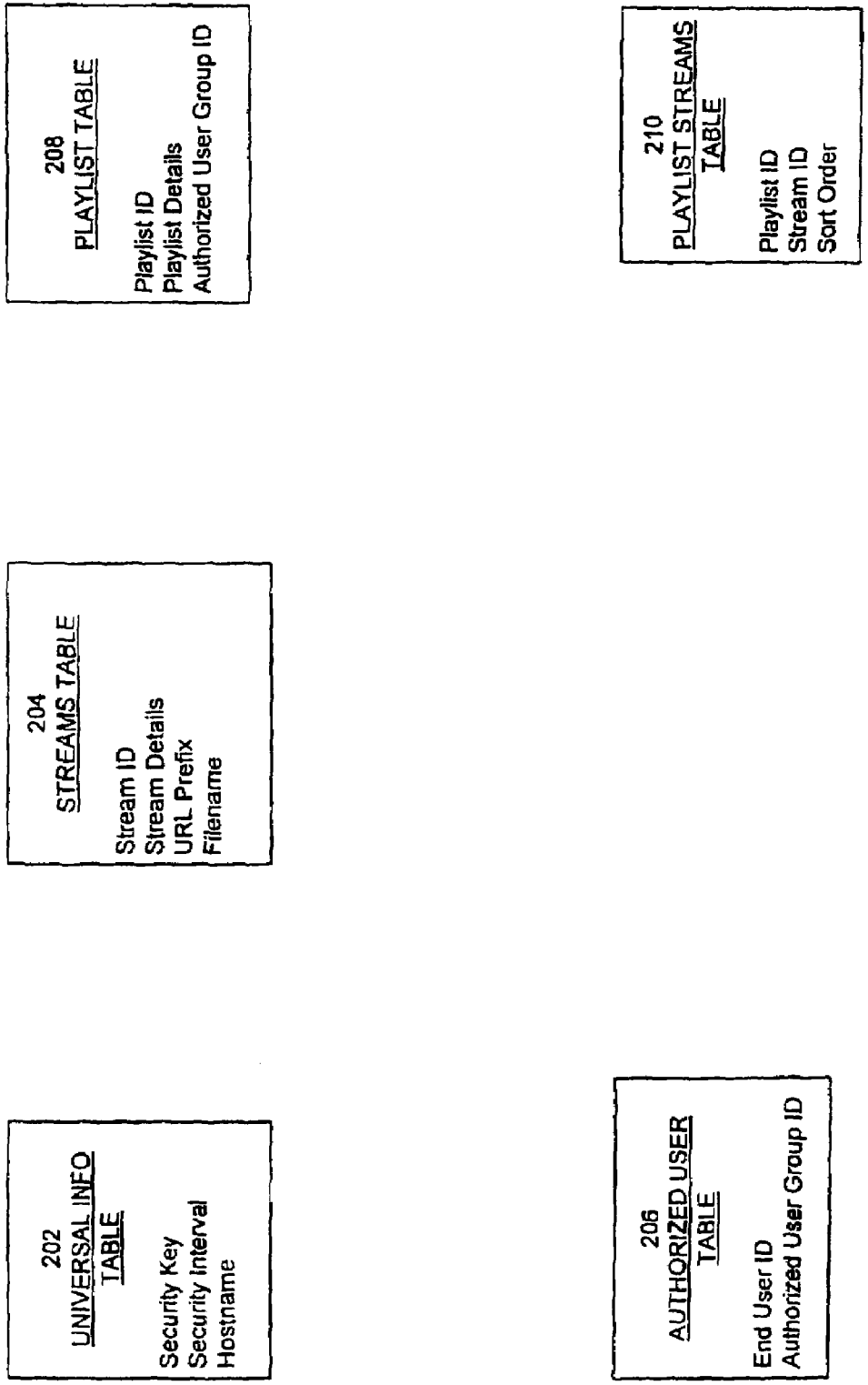
FIG. 2 is a schematic illustrating the database according to one embodiment of the present invention.

An exemplary representation of the CM database 108 is illustrated in FIG. 2. As shown, the database 108 includes information universally applicable to all items of streaming content and several tables of related data. The universal information 202 includes a security key, a security time interval and the name ("Hostname") of the streaming media server 104 on which the content resides. The security key and the security interval are used in authorizing end users 102 to access the content and, therefore, are preferably maintained in secret and set by the owner of the content. The security key and security interval are used for controlling access to all content, although in alternate embodiments each content file has its own security key and security interval associated therewith.

The CM database 108 further includes a series of tables containing content or Stream Identifying information. More specifically, the Streams Table 204 includes a record for each item of streaming content, as identified by a unique stream identifier (ID). Furthermore, each record includes: the stream details that describe the content file, including, for example, the creation date of the content file, a description of the file, an identification of whether the content is audio and or video, the platform to which the content relates, the date on which the content was last modified, any codec necessary for viewing of the content, the length and size of the content, the expiration date (if any) of the content, the stream type, such as .asf or .rm, title of the content, author of the content, status of the content, copyright notice for the content, bit rate of the content and the like. Each record also includes: the prefix used to generate a link to the media server 104 ("URL Prefix"); and the name of the content file ("Filename"), as stored on the streaming media server 104. It should be understood that the filename may point to an actual path on storage coupled to a streaming media server 104 for on-demand content or the filename may point to an alias, port or channel for a live stream.

The database 108 also includes tables containing "playlist" information. A client's playlist is generally a group of one or more content files logically associated for the purpose of being made available as a group. Each content file identified as part of a playlist can also be made available individually. Such playlist information is contained within the Playlist Table 208 and the Playlist Streams Table 210. In general, the Playlist Table 208 includes records identifying each playlist, as identified by a playlist ID. Each record further includes playlist details, including, for example, the playlist format (such as Windows Media Player or Real-Player), the playlist description, the playlist name, and the like, and the authorized user group ID for the playlist.

The authorized user group ID corresponds to a group of end users 102 that are authorized to view the particular playlist. More specifically, the database 108 further includes an Authorized User Table 206 that correlates each end user 102, as identified by a unique end user ID, to one or more authorized user group IDs. In order for an end user 102 to view a playlist, the end user 102 must be identified as part of the authorized user group ID for that content file. In certain alternate embodiments, no authorized group ID is used, while in other alternate embodiments each content file has an authorized group ID associated therewith.

The Playlist Streams Table 210 includes records correlating each playlist, as identified by the playlist ID, with the constituent content files, as identified by Stream ID. Each record also contains the information indicative of the order of each content file in the playlist ("Sort Order").

Having described the components utilized in the present embodiment, the process of controlling access to the streaming media content will now be described. By way of overview, an authorization software component located on the web server 106 generates a hash value or "ticket" based upon public key information, private key information and the then current time. The public key is a unique identifier for the streaming content requested by the end user 102 and the end user's user ID. The private key includes a security key and security time interval set by the owner of content.

The streaming media server 104 on which the requested content resides receives the stream request, which includes the public key, and the ticket as generated by the web server 106. The streaming media server 104 proceeds to use locally stored private key information to generate its own version of the ticket. The streaming media server 104 either denies or provides access to the requested streaming media content based on a comparison of the tickets as generated by the streaming media server 104 and web server 106.

Figure 3:
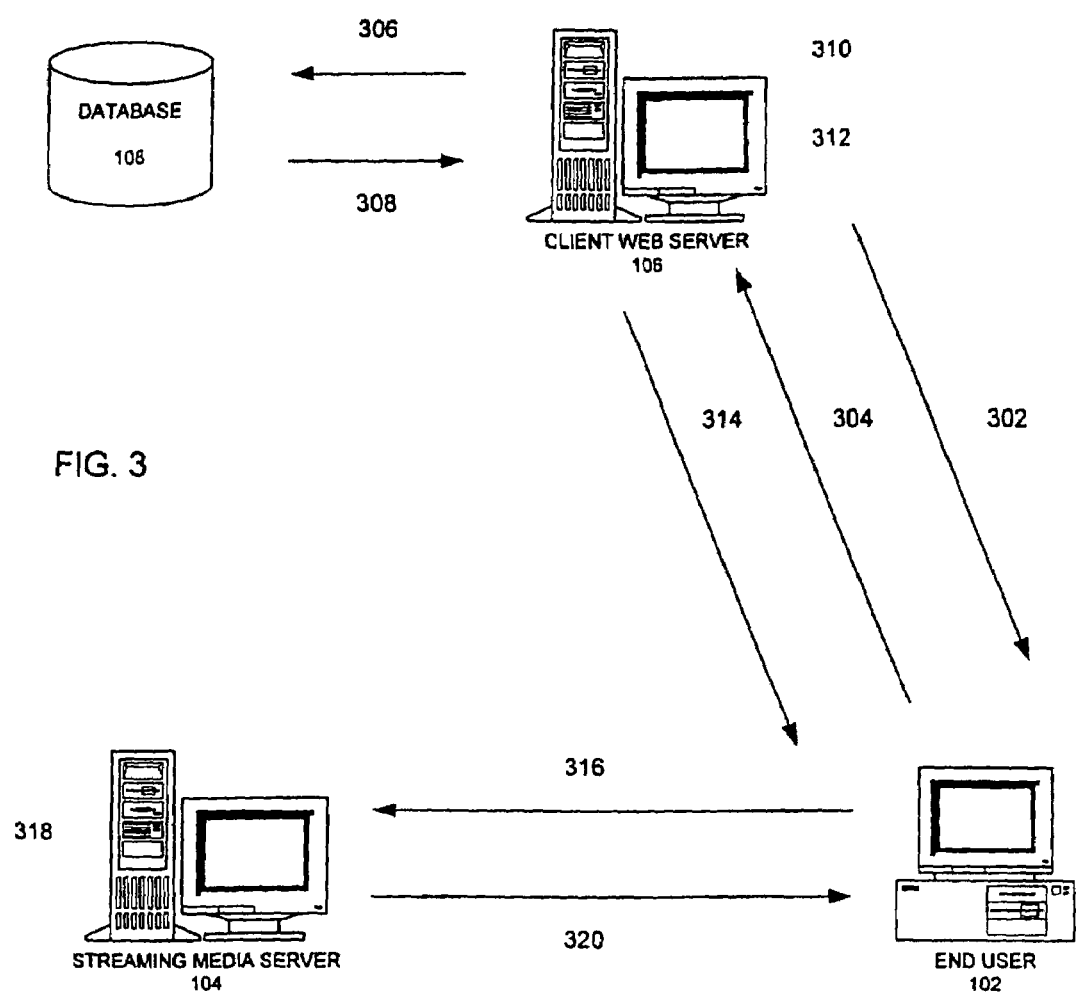
FIG. 3 is a schematic illustrating the workflow according to one embodiment of the present invention.
Figure 4:
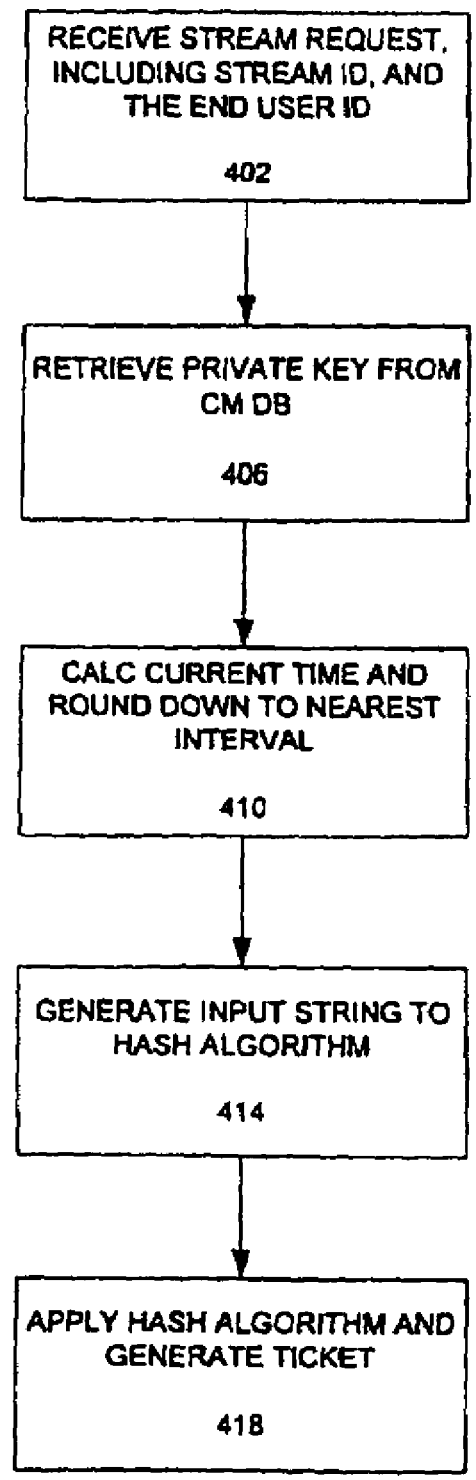
FIG. 4 is a flowchart illustrating the process of generating a ticket according to one embodiment of the present invention.

The process of controlling access will now be described in greater detail with reference to the workflow diagram of FIG. 3 and the flow charts of FIGS. 4 and 5. In the present example, the end user 102 requests access to an individual streaming media content file. Initially, the web server 106 provides a web page requesting the end user to log in to an authorization application and presenting the end user with the option of viewing certain streaming media. Step 302. For example, such a page may include a form requesting the end user to select for viewing one of several content files, each of which has its own stream request link, to provide its end user ID (which the owner of the content previously assigned and provided to the end user) and to provide a credit card number so that the end user may be charged for access to the selected content. In an alternate embodiment, the end user previously registered with the owner of the content by providing the end user's contact information and billing information, which the owner stores in a table in the database along with the assigned end user ID.

In response to the web page, the end user provides the end user's user ID and activates a link, thereby logging into the authorization application and requesting access to the particular streaming media content file associated with the link. Step 304. An exemplary stream request, wherein the Stream ID is represented by "123456," is as follows:
<A href http://webserver.company.com/getstream.asp?ID=123456>

In the present embodiment the authentication application is a ".dll" software component residing on the web server 106. However, one skilled in the art will recognize that any other programming language or technology, such as, for example, an active server page (ASP) or servlet, could be used to implement the functionality described herein. Irrespective of the particular programming technology, it is preferable that the authentication application run on the web server 106 to alleviate any processing bottlenecks on the end user processor 102.

Once the end user logs into the authentication application and the web server 106 receives the stream request and the end user ID from the end user, the web server 106 continues by dynamically generating the authentication ticket and dynamically generate a link to the selected content file. More specifically, under control of the authentication application, the web server 106 issues a request to the database 108 for the private key for use in generating the authorization ticket. Step 306. The web server 106 issues a database query to retrieve from the CM database 108 the private key, comprising the security key and security interval associated with the requested content file. In response, the CM database 108 returns the private key to the web server 106. Step 308.

Having obtained the private key from the database 108, the web server 106 generates the ticket. Step 310. As described more fully with reference to FIG. 4, the web server 106 utilizes the private key, Stream ID, end user ID, the current time and a hash algorithm to generate the ticket. In the present embodiment, the web server 106 can use the Stream ID to generate the ticket because the Stream ID of the requested content is included in the stream request link activated by the end user in step 304. In alternate embodiments, however, the stream request provided by the end user includes unique identifying information other than the Stream ID, such as, for example, the title, author and/or filename of the content. In such an embodiment, the web server 106 searches the Streams Table 204 and retrieves the Stream ID based on the identifying information contained in the stream request. In yet another alternate embodiment, the stream request includes a unique identifier other than the Stream ID, such as the filename or path, which the system uses to generate the ticket.

Once the ticket is generated, the web server 106 generates the link to the requested content on the media server 104. More specifically, based on the illustrative stream request shown above, the media player residing at the end user processor 102 makes a call to "webserver.company.com" (i.e., the web server 106) that will execute the "getstream.asp" program for dynamically generating the link to the media server 104. Step 312. One skilled in the art will recognize that although the "getstream" application has an Active Server Page (or ASP) extension, it is not necessary to use ASP technologies. Rather, any programming or scripting language or technology, such as a ".dll" component, could be used to provide the desired functionality. As with the authentication application, it is preferred, however, that the program run on the server side so as to alleviate any processing bottlenecks at the end user processor 102. The "getstream.asp" program functions to cause the web server 106 to make a call to the CM database 108 to retrieve the data necessary to dynamically generate the link to the media server 104. More specifically, the web server 106 retrieves the Hostname from the Universal Info Table 202 and the URL Prefix and Filename from the Streams Table 204. The "getstream.asp" program also appends the Stream ID, the ticket and the end user ID to the end of the link. The web server 106 then returns the link to the media player at the end user processor 102. Step 314.

An illustrative link to the media file is as follows, wherein: the URL Prefix is requested by "mms://"; the Hostname is represented by "mediaserver.company.com"; the Filename is represented by "stream1.asf"; the Stream ID of the requested item of content is represented by "123456"; the ticket is represented by "uvw123xyz"; and the end user ID is represented by "abc123def".
<REF href="mms://mediaserver.company.com/stream1.asf?ID=123456&TICKET=uvw123xyz&USER_ID=abc123def">

Having received the link, the end user processor 102 proceeds to request the streaming media content. Step 316. More specifically, the media player residing on the end user processor 102 makes a call to "mediaserver.company.com" (i.e., the streaming media server 104), as identified in the link. As part of the call, the media player provides the streaming media server 104 with the copy of the requested content's Stream ID, the ticket generated by the web server 106 and the end user ID.

Having received the link, which includes the Stream ID, the end user ID and the ticket, the streaming media server 104 proceeds to determine whether or not to grant the end user access to the requested content. Step 318. As described in greater detail below with reference to FIG. 5, the streaming media server 104 determines whether or not to grant access by independently generating a ticket based on locally stored private key information and the Stream ID and end user ID contained in the link. In general, if the ticket generated by the streaming media server 104 matches the ticket as generated by the web server 106, the streaming media server 104 provides the requested streaming media content to the end user processor 102. Step 320.

It should be understood that the term match can have differing meanings in different embodiments. Match can refer to an exact match or a match within a predefined range. Alternatively match can two values that differ from each other by a standard deviation that is based on some algorithm or equation.

The process of generating the ticket by the web server 106 will now be described in greater detail with reference to FIG. 4. As noted above, the ticket generation process is preferably performed by an authorization software plug-in residing at the web server 106. In the present embodiment, the process beings with the web server 106 receiving the stream request, including the Stream ID, and the end user ID. Step 402. The web server 106 then proceeds to access the database 108 to retrieve the private key information associated with the requested Stream ID. Step 406. Such private key information includes the universal security key and the security interval. In an alternate embodiment, each stream has its own security key and security interval stored as fields in the Streams Table 204, which the web server 106 retrieves based on the Stream ID contained in the stream request.

As noted above, the web server 106 also uses the current time to generate the ticket. More specifically, the web server 106 calculates the current time and rounds the time down to the nearest multiple of the security interval. Step 410. The present embodiment utilizes Universal Coordinated Time (UTC) in seconds, as generated by the C programming language standard library function "time ( )". Exemplary Perl programming code for generating the time as rounded down to the nearest multiple of the security interval (represented by the variable "$time") is as follows, wherein the variable "$interval" corresponds to the security interval, which equals 15 minutes.

```

# example of 15 minute ticket expiration/security interval

$interval=15*60
$time=int(time( )/$interval)*$interval;
```

By way of example, if the current time was May 31, 2000 at 2:16:07 pm, Central Time, the function "time ( )" returns a value of approximately "959800567". Rounding down this UTC value to the nearest 15 minute interval results in a value of approximately "959800500," which represents a time of May 31, 200 at 2:15:00 pm Central Time.

It is to be understood that the foregoing exemplary code may be modified and still be within the scope of the present invention. For example, the security interval need not be in minutes; the interval may be represented in other units of time so long as an appropriate conversion is performed so that the interval is represented in the unit of time utilized by the "time ( )" function. Furthermore, in alternate embodiments the current time is based on a standard other than UTC. In one such embodiment, the time standard is unique to the web server 106 and streaming media server 104. It is also to be understood that it is within the scope of the present invention to have the end user processor 102 calculate the time and pass the value to the web server 106 for use in generating the authorization ticket. In still further alternate embodiments, the security interval is selected so that the standard time is simply truncated to a desired number of digits.

Once the web server 106 has the input values to the hash algorithm—the public key information, private key information, and the time value—the web server 106 generates the input string to the hash algorithm. Step 414. In the present embodiment, the hash algorithm is the "MD 5" message digest algorithm. Also in the present embodiment, the media server 104 and web server 106 utilize the same algorithm.

It is to be understood that it is within the scope of the present invention to utilize essentially any hash or cryptographic algorithm to generate the ticket. Furthermore, the two servers generating the tickets (in the foregoing embodiment, the web server 106 and the streaming media server 104) preferably generate the same ticket based on the same inputs or tickets within a known deviation of each other based on the same inputs. In alternate embodiments one of a plurality of potential algorithms are used to increase security. By way of example, such embodiments use one randomly selected algorithm from a plurality of potential algorithms or can select one of a plurality of algorithms based on the requested content, the date or time of the request, the particular end user, the entity owning the content, and the like. In such embodiments, the system passes to the media server an indication of the algorithm used by the web server, or the media server includes logic that causes it to select and use the same algorithm utilized by the web server.

Any arrangement of the input values may be used as the input string so long as the input string is valid for the particular hash algorithm being used and so long as the streaming media server 104 knows the arrangement of the input string. In the present embodiment the following predetermined arrangement is used, wherein "T" represents a digit of the time value, "K" represents an alphanumerical character in the security key, "S" represents a digit of the Stream ID (including any necessary leading padding characters) and "U" represents an alphanumerical character of the end user ID (including any necessary leading padding characters).

TTTTTTTTTT-
KKKKKKKKKKSSSSSSSSSSUUUUUUUUU

In alternate embodiments input strings may be of different lengths.

Having generated the hash algorithm input string, the web server 106 applies the hash algorithm to the input string, thereby generating the ticket. Step 418.

The process of the streaming media server 104 determining whether to grant access to the requested content stream will now be discussed with reference to FIG. 5. As an initial matter, it should be noted that, although not required, the media server of the present embodiment 104 generates three authentication tickets, each based on a different time value, for use in determining whether to grant access. Furthermore, as with the web server functionality, it is preferable that the process of determining whether to grant access is implemented in an authorization software component residing on the media server 104.

In determining whether to grant access, the streaming media server 104 first receives the stream request, including the Stream ID, end user ID and ticket, from the media player residing on the end user's processor 102. Step 502. Once the stream request is received, the media server 104 generates the input string to the hash algorithm. In this regard, the media server 104 retrieves from local memory the private key information, namely the security key and security interval. Step 506. Preferably, the media server 104 stores the private key information in local memory, however, in alternate embodiments the media server 104 stores the information in an active directory tree accessed by, for example, Light-Weight Directory Access Protocol provided by the Microsoft Corporation, or in a remote database. In still another alternate embodiment, the media server 104 retrieves the private key information by accessing the database 108 via a network connection, such as Local Area Network (LAN).

As did the web server 106, the media server 104 also calculates the current time and rounds the time down (i.e., earlier in time) to the nearest multiple of the security interval. Step 510. Unlike the web server 106, however, the streaming media server 104 also calculates a second time value equal to the current time rounded down to the next nearest multiple of the security interval below (i.e., earlier than) the first time value calculated by the media server 104. Step 510. The media server 104 further calculates a third time value equal to the current time rounded up (i.e., later in time) to the nearest multiple of the security interval. Step 510.

The media server 104 then uses the retrieved private key information, the received public key information and the three time values to generate three corresponding hash input strings. Step 514. The media server 104 then applies each of the three input strings to the hash algorithm, thereby generating three tickets. Step 518.

Having independently generated the tickets, the media server 104 then determines whether any of the tickets generated by the media server 104 match the ticket as generated by the web server 106. Step 522. If the tickets do not match, then it is likely that the stream request is not authentic and/or has expired (i.e., was generated by the media server 104 at a time outside of the security interval as measured from the time of the user's request). Accordingly, the media server 104 denies access to the requested content. Step 526

If the tickets do match, then it is likely that the stream request is both authentic and within the security interval. However, prior to granting access, the media server 104 first determines whether the end user has already requested access to and viewed the same content. Step 530. The media server 104 maintains, preferably in local memory, a list of end user IDs and corresponding Stream IDs to which the end user has been granted access. To determine whether the end user has already viewed the requested content, the media server 104 accesses memory to determine whether the received end user ID and Stream ID have previously been stored. If the end user ID and Stream ID have previously been stored, then the end user is denied access to the requested content. Step 530.

If the received end user ID and Stream ID have not previously been stored, the media server 104 proceeds to store the end user ID and Stream ID in memory (step 534) and provides the end user access to the content. Step 538. As such, storing the end user ID and Stream ID provides an added, optional level of security protection that prevents end users from sharing the link pointing to the requested content with others.

It is to be understood that the use of three tickets is preferable to account for a lack of synchronization between the local time of the web server 106 and the local time of the media server 104. Furthermore, in certain circumstances the first ticket generated by the media server 104 (i.e., based on the current time rounded down to the nearest multiple of the security interval) will not match the first ticket generated by the web server 106 even though the end user is authorized. For example, given a security interval of 15 minutes, if the web server 106 generates the ticket at 12:14:00 pm and the media server 104 generates its first ticket at 12:16:00 pm, on the same day in the same time zone, the tickets will not match even though the request is within the security interval. The web server will generate the ticket based on a time value corresponding to 12:00:00 pm, while the media server 104 will generate a ticket based on a time value corresponding to 12:15:00 pm. Accordingly, in the present embodiment the media server 104 generates the second ticket based on the then current time rounded down to the next nearest multiple of the security interval; in the present example, a time value corresponding to 12:00:00 pm. As such, the second ticket would match the ticket as generated by the web server 106. Similarly, it is possible for access to be granted to an end user after the security interval has elapsed. Thus, in the present embodiment the security interval should be selected to account for the use of multiple tickets. Preferably, the web server 106 and the media server 104 have clocks synchronized to within about one-half of the security interval.

It is to be understood that it is also within the scope of the present invention for the media server 104 to generate one or more different tickets as an alternative to the three tickets in the foregoing embodiment. Furthermore, although the foregoing embodiment describes the tickets as being generated together, in parallel, it is within the scope of the invention for the media server 104 to generate and/or compare the tickets, one after another, in serial. It is also to be understood that the time values may be generated in any of a number of ways, including, for example, by simply adding or subtracting the security interval from the first time value calculated by the media server 104.

In an alternate embodiment, another level of security may be provided. Specifically, if the ticket generated by the web server 106 matches one of the tickets generated by the media server 104, then the media server 104 proceeds to determine whether the same ticket has been previously generated. The media server 104 maintains a list of tickets for which access has been granted. Such a list logically represents all "used" tickets. If the matched ticket is not on the list of "used" tickets, then the media server 104 grants access, providing the requested content to the media player residing at the end user's processor 102. As part of granting access, the media server 104 also updates the listing of "used" tickets. If the matched ticket is on the list of used tickets, then the media server 104 denies access and provides an appropriate message to the requesting end user. By tracking the used tickets, the system prevents an authorized end user from sharing the streaming request received from the web server 106 with others.

It is also to be understood that it is within the scope of the present invention to use error calculations in determining whether to grant access. For example, one error calculation involves the media server 104 generating one or more additional tickets based on the current time plus and/or minus an error interval, such as, for example, a predetermined time period (e.g., 15 minutes, 30 minutes, etc.), a set percentage of the applicable security interval (e.g., 50%, 125%, etc.) or some other error calculation. Such error calculations may be used as an alternative to the second or third time values in the foregoing embodiment or in addition thereto.

In alternate embodiments the web server 106 and media server 104 generate tickets by calculating the time value differently than the foregoing embodiment. In one exemplary embodiment, the web server 106 and media server 104 calculate the current time and round it down to or up to a multiple of some interval other than the security interval. In one such an embodiment where the security interval is 15 minutes, the web server 106 generates the ticket based on the current time rounded down to the nearest interval of 5 minutes. The streaming media server 104, in turn, generates a ticket based on the current time rounded down to the same interval of 5 minutes. If the tickets do not match, the media server 104 proceeds to generate a ticket based on the time rounded down to the next lower interval. The media server continues to generate tickets based on the next lower interval for a set number of times or until the web server and media server tickets match. Preferably, the media server 104 repeatedly generates new tickets based on time intervals the sum of which span at least the security interval. In the present example, the media server 104 generates at least three tickets, each an interval of 5 minutes, for a total of 15 minutes.

It is to be understood that it is within the scope of the present invention to entirely omit use of the end user ID in the authorization process or to use the end user ID in a manner different from that described above. For example, in an alternate embodiment the end user ID is not used as part of the input string to the hash algorithm. Instead, the database 108 also includes tables for tracking which end users have requested access to the content. Such an embodiment includes a Viewing User (Streams) Table that contains records correlating content, as identified by Stream ID, with end users, as identified by end user IDs, that have accessed or viewed the content stream. The embodiment similarly includes a Viewing User (Playlists) Table that contains records correlating playlists, as identified by playlist ID, with end users, as identified by end user IDs, that have accessed or viewed the playlist. Before generating the authorization ticket, the web server checks the appropriate Viewing User Table to determine whether the same end user has requested access to a particular stream or playlist. In the event an end user has previously requested access, the web server either denies access or provides a web page to the end user indicating that the end user will be charged again for the subsequent access. The tables are automatically cleared after a period of time, such as the security interval or some period in excess thereof.

It is to be understood that the present invention may also be embodied in relatively more complex systems, for example, ones in which a service provider operates web servers, streaming media servers, and playlist servers, on behalf of its clients—the owners of the content. One such an embodiment will now be described with reference to FIGS. 6–8. It will be understood by one skilled in the art that much of the functionality of the present embodiment is the same as that of the embodiment of FIG. 3 and, as such, can be implemented by any of the same technologies.

Figure 6:
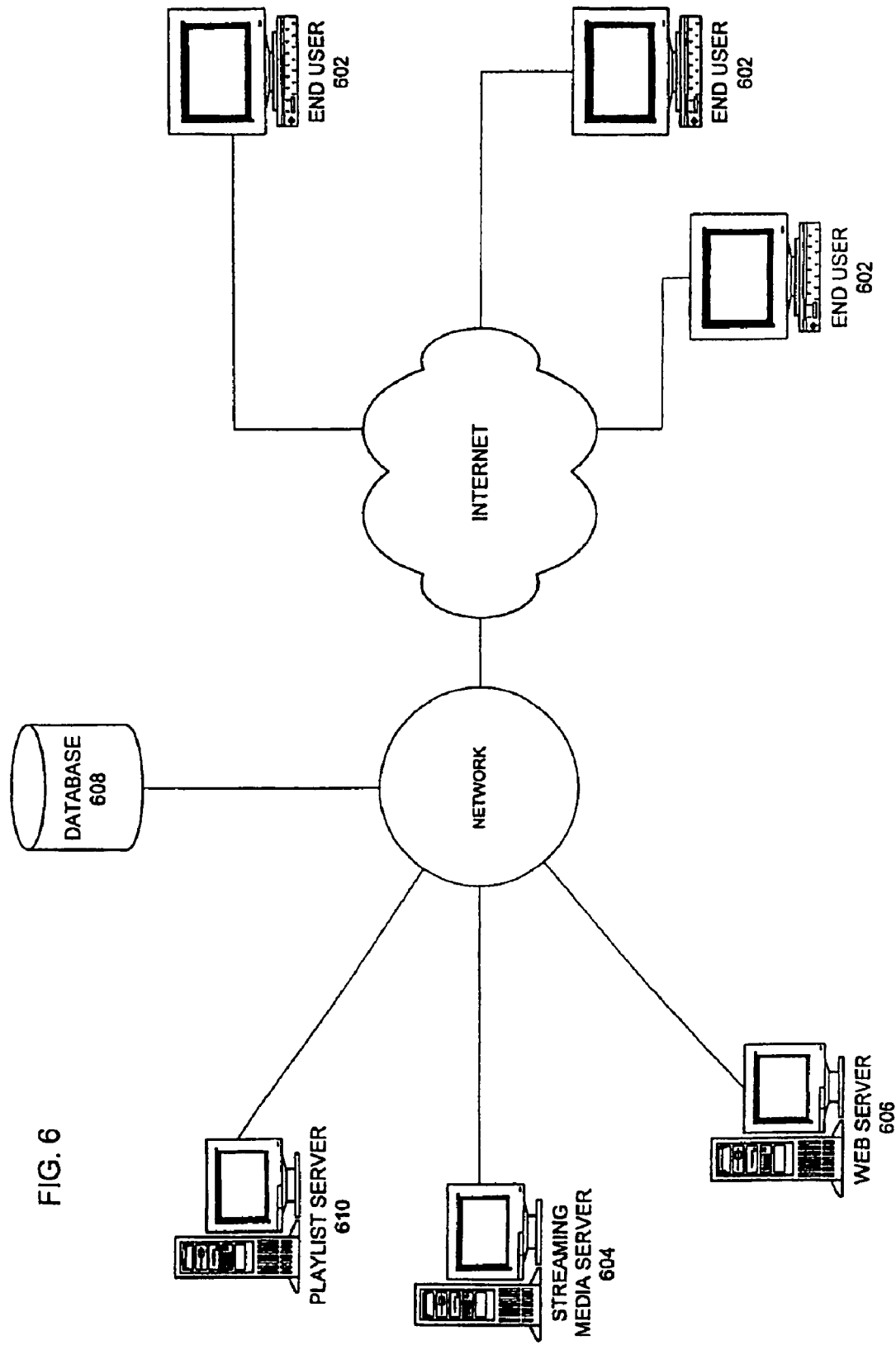
FIG. 6 is a schematic illustrating the system according to an alternate embodiment of the present invention.

As shown in FIG. 6, the system includes several components similar to those of the embodiment of FIG. 1, including end user processors 602, one or more streaming media servers 604, and one or more web servers 606, including a database 608, all of which are couple to the Internet or other network. Additionally, the system of the present embodiment also includes a playlist server 610 that is also operated by the service provider. Preferably, the web server 606, streaming media servers 604, including the database 608, and playlist server 610 are connected to the service provider's network, such as a local area network (LAN) or wide area network (WAN), and the Internet.

Figure 7:
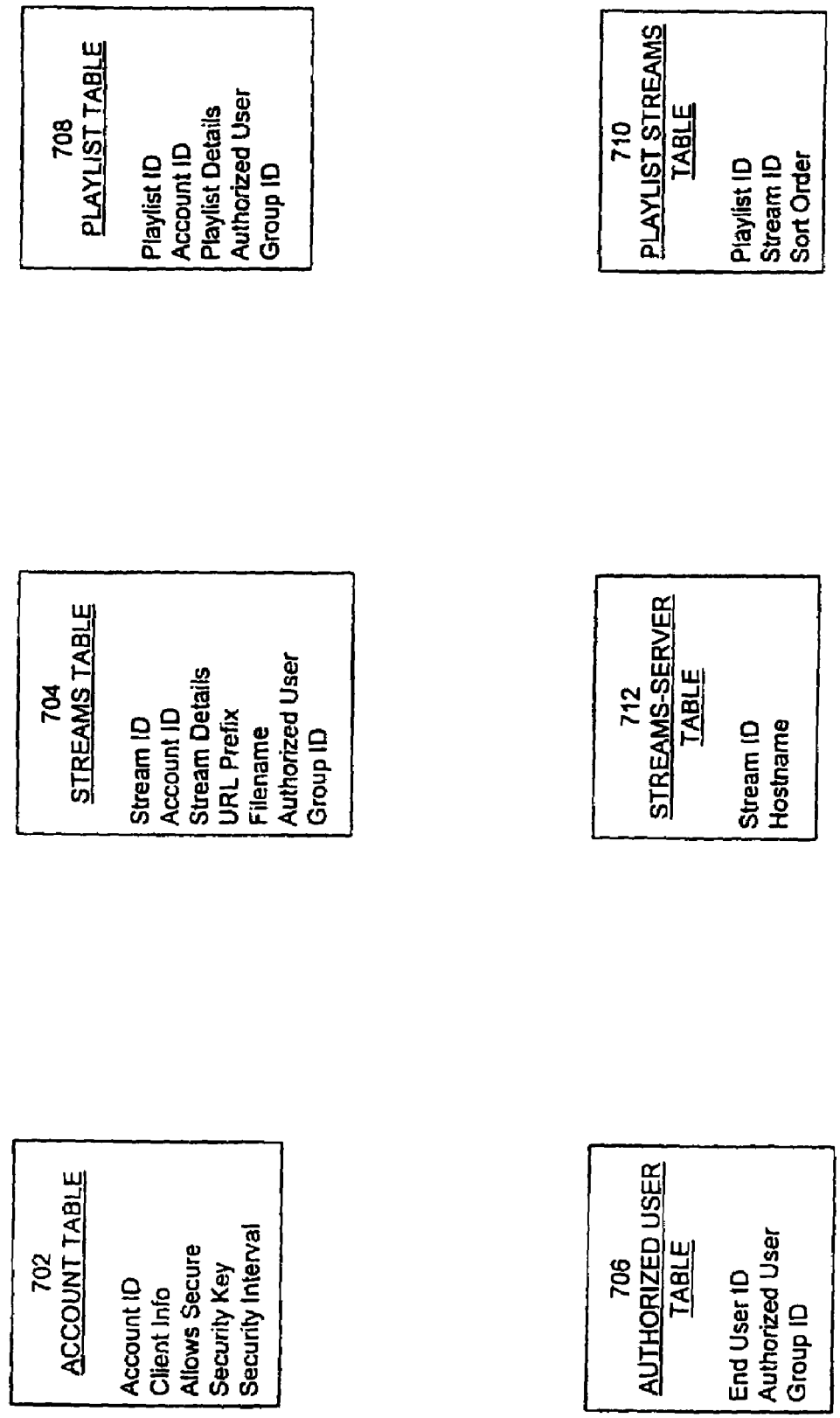
FIG. 7 is a schematic illustrating the database according to an alternate embodiment of the present invention.

In general, the database 608 includes the same information contained in the database of the embodiment of FIG. 2, however, the information is stored on a client account-by-client account basis. As shown in FIG. 7, the database 608 includes an Account Table 702 that includes a record for each client, as identified by an Account ID. Each record further includes: client-identifying information ("Client Info"), such as client name, address, billing information, and the like; an indication as to whether or not the client's content is secure ("Allows Secure"); the client's security key ("Security Key"); and security interval ("Security Interval").

As with the embodiment of FIG. 2, the present database 608 also includes a Streams Table 704, which includes stream identifying information for each content file, as identified by Stream ID, an Authorized User Table 706, which associates end user IDs with Authorized User Group IDs, a Playlist Table 708, which contains playlist identifying information for each playlist, as identified by playlist ID, and a Playlist Streams Table 710, which identifies the Stream IDs associated with a given playlist ID. In addition to the information fields described in connection with the database of FIG. 2, the present Streams Table 704 and Playlist Table 708 further include a field identifying the Account ID associated with each content file and each playlist, respectively.

The present database 608 also includes a Streams-Server Table 712 that contains a record for each content file, as specified by Stream ID, identifying the Hostname of the particular streaming media server 104 on which the content file resides. As with the embodiment of FIG. 2, the Hostname is the DNS name of the media server 104.

The operation of the present embodiment will now be described with reference to the work flow diagram of FIG. 8. For purposes of the present example, the end user requests access to a playlist having one item of secure content. Initially, the web server 606 provides a web page requesting the end user to log in to an authorization application and presenting the end user with the option of viewing certain streaming media. Step 802. As with the embodiment of FIG. 3, an exemplary web page may include a form requesting the end user to select a particular content file by activating a link, provide an end user ID and provide billing information. In response to the web page, the end user provides the end user's user ID and credit card information and activates the stream request link, thereby requesting access to a particular streaming media content file. An exemplary stream request link, where the playlist ID is "789000", is as follows:

<A href "http://playlistserver.company.com/makeplaylist.dll?ID=789000">

When the end user activates the stream request link, a programming script running on the end user processor 602 causes the stream request link and the end user ID to be sent to the web server 606. Step 804. One skilled in the art will recognize that the end user script may be implemented in essentially any programming language, including, for example, C++, Perl, Visual Basic, Java and the like. In the present embodiment, the script is a Java script and is running in conjunction with the end user's web browser.

Once the web server 606 receives the stream request from the script, the web server 606, under the direction of an authorization software plug-in, generates the ticket. In this regard, the web server 606 issues a request to the database 608 for the private key (in the present embodiment the security key and security interval associated with the requested playlist) for use in generating the authorization ticket. Step 806. In response, the database 608 returns the private key to the web server 606. Step 808.

Having obtained the private key from the database 608, the web server 606 generates the ticket as described above with reference to FIG. 4. Using the playlist ID instead of the streamed (replace by the playlist ID in the present embodiment). Step 810. As described therein, the web server 606 applies the private key, Stream ID, end user ID and the time values to a hash algorithm to generate the ticket. The web server 606 then returns the ticket and the end user ID to the web browser running on the end user processor 602. Step 812.

Having received the ticket, the script running on the end user processor 602 appends the information to the end of stream request link. Step 814. An exemplary link, wherein the playlist ID is represented by "789000," the ticket is represented by "uvw123xyz," and the end user ID is represented by "abc123def," is as follows:

<A href"http://playlistserver.company.com/makeplaylist?ID=789000&TICKET=uvw123xyz return&USER_ID=abc123def">

The script running on the end user processor 602 then causes a call to be made to the playlist server 610, as identified in the stream request link by the Hostname "playlistserver.company.com." Step 816. Accordingly, the playlist server 810 is provided with the link, playlist ID, ticket and user ID. Under control of the "makeplaylist.dll" object, the playlist server 610 generates a redirector file, such as an ASX file where the content is in the Windows Media format. Step 818. The "makeplaylist" program may be implemented using any of a number of programs or technologies, including, for example, an ASP. The redirector file contains a link to the requested content, along with the ticket and public key (i.e., Stream ID and end user ID). To generate the redirector file, the playlist server 610 accesses the database 608 to retrieve the Stream ID of content file comprising the playlist and the information necessary to link to the content file, including the Hostname, URL Prefix and Filename, associated with the Stream ID.

Figure 10:
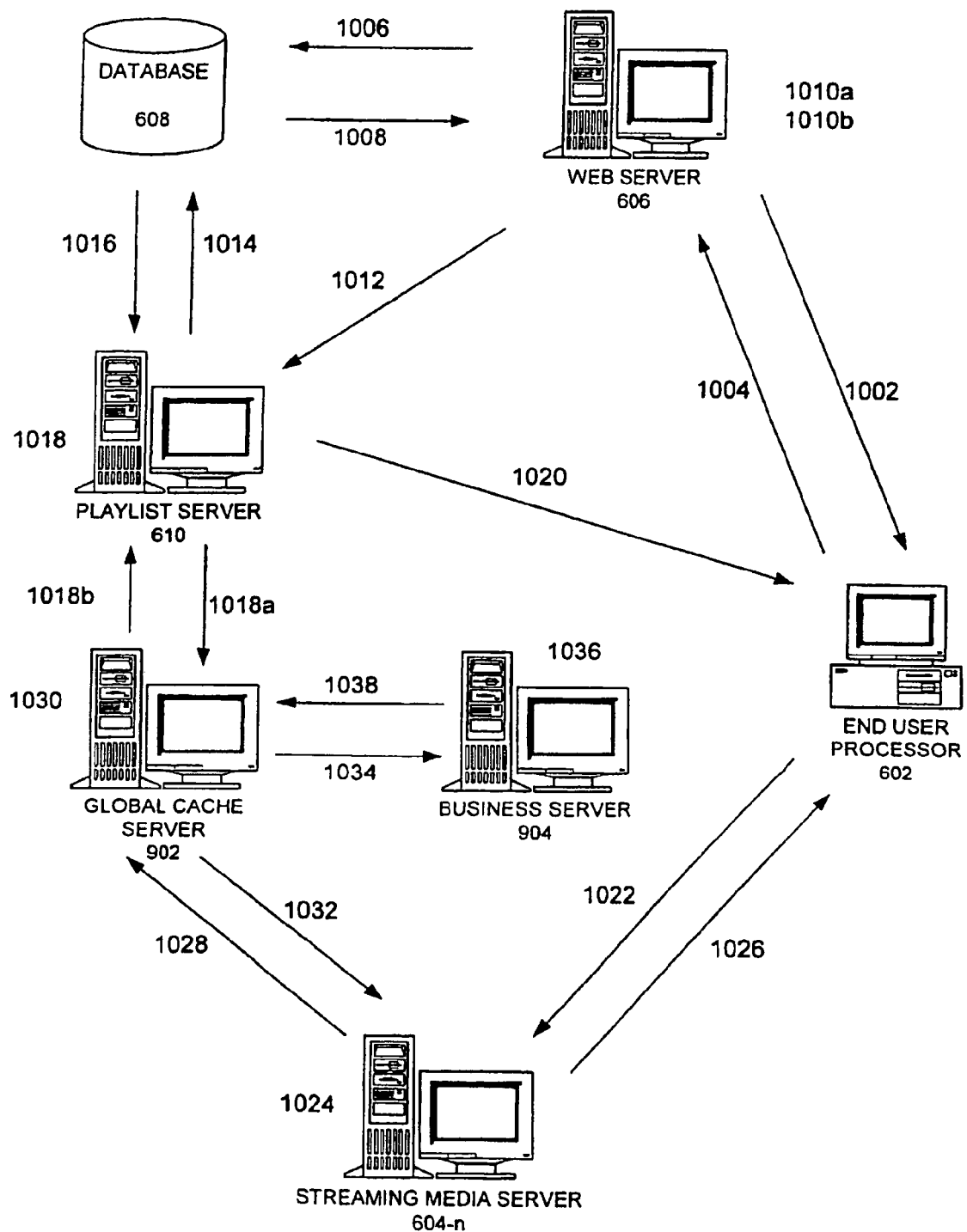
FIG. 10 is a schematic illustrating the workflow according to an alternate embodiment of the present invention.

In an alternate embodiment, no end user script is utilized to append the ticket to the stream request. Instead, when the end user provides its end user ID and activates the stream request link (in step 804), the authentication application running on the web server 606 generates the ticket, appends the ticket and end user ID to the stream request link, and directly makes the call to the playlist server 610 to create the redirector file. Because the web server 606 also passes to the playlist server 610 information identifying the media player on the end user processor 602, the playlist server 610 forwards the redirector file to the media player (thereby obviating steps 812, 814 and 816). Such an embodiment is described below with reference to FIG. 10.

The playlist server 610 then passes the ASX redirector file to the media player at the end user processor 602. Step 820. For purposes of the present example, the ASX file is as follows, wherein the URL Prefix is represented by "mms://"; the Hostname of the appropriate media server 604 is represented by "mediaserver.company.com"; the Filename is represented by "stream1.asf"; the requested item of content Stream ID is represented by "123456"; the ticket is represented by "uvw123xyz" and the end user ID is represented by "abc123def"; and:

<ASX>
    <ENTRY>
        <REF href="mms://mediaserver.company.com/stream1.asf?ID=123456&TICKET=uvw123xyz& USER_ID=abc123def">
    </ENTRY>
</ASX>

The redirector file may include other information, such as metadata for the content file, or other, non-secure files, such as advertisements.

Having received the ASX file, the end user processor 602 proceeds to request the streaming media content. More specifically, the media player makes a call to "mediaserver.company.com" (i.e., the streaming media server 604), as identified in the ASX file. Step 822. Once the call is made, the media player provides the streaming media server 604 with the copy of the requested content's Stream ID, the ticket generated by the web server 606 and the end user ID.

In response to the media player's call, the streaming media server 604 proceeds to determine whether or not to grant the end user access to the requested content. Step 824. The streaming media server 604 determines whether or not to grant access by independently generating one or more authentication tickets and comparing the tickets to the ticket generated by the web server 606. The process of generating and comparing the authorization tickets is achieved in the same manner as described with reference to FIG. 5, using the playlist ID instead of a stream ID. If a ticket generated by the media server 604 matches the ticket generated by the web server 606, the media server 604 grants the end user access to the requested content. Step 824.

While it is to be understood that the foregoing embodiments provide owners of secure content with a significant level of protection against unauthorized access to the secure content, additional levels of protection may be implemented. One such additional level of protection involves limiting the number of content files a particular end user may access at any given time. Another level of protection limits the number of different processors (e.g., computers) a particular end user may use to access secure content. While any of the foregoing embodiments may be modified to include such additional levels of protection, implementation of the additional protection will now be described with reference to FIGS. 9 and 10.

Figure 8:
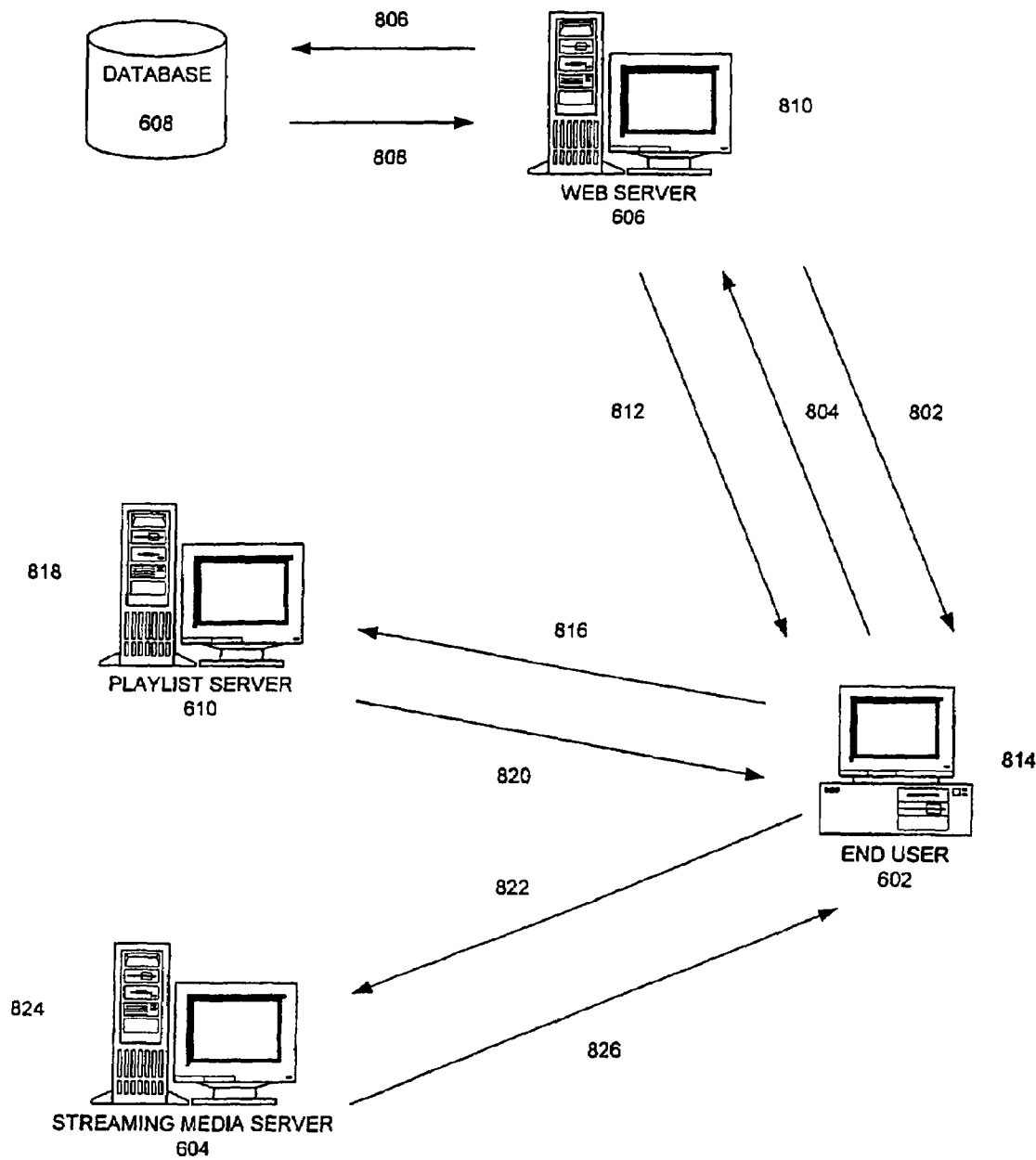
FIG. 8 is a schematic illustrating the workflow according to an alternate embodiment of the present invention.
Figure 9:
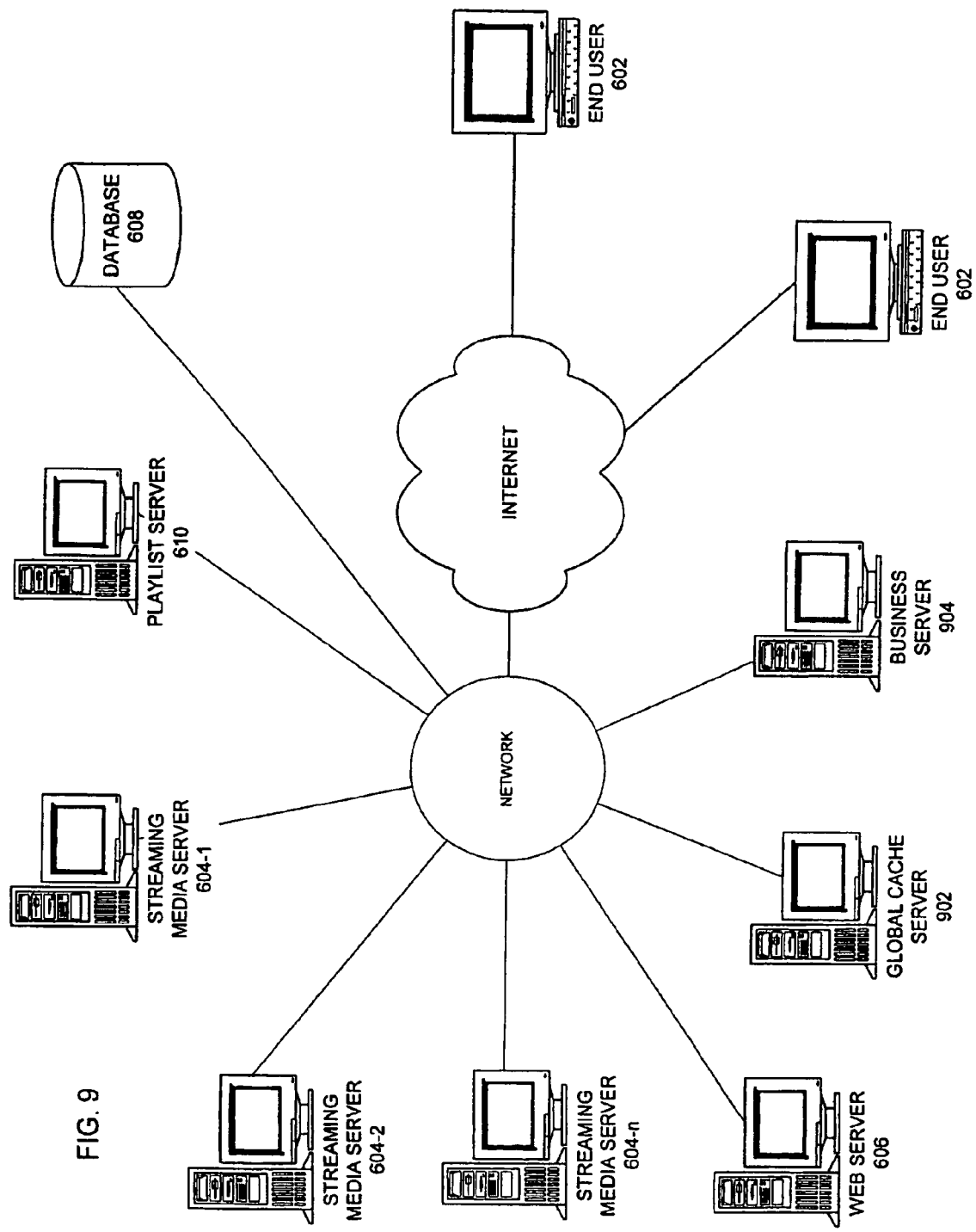
FIG. 9 is a schematic illustrating the system according to an alternate embodiment of the present invention.

As can be seen in the schematic of FIG. 9, the present embodiment is based on the embodiment illustrated in and described with reference to FIGS. 6–8. In general, the content delivery and authentication system includes the web server 606, database 608 and playlist server 610, as described above. Furthermore, although not required, the system includes multiple streaming media servers 604-1, 604-2, 604-n (generically referred to as 604), each of which is identified by a server ID and contains secure content. Preferably, the streaming media servers 604 each contain copies of the same streaming content and the system balances the load on the multiple streaming media servers by using a round robin or other load balancing scheme. The database 608 correlates each content file with the server ID(s) on which it is stored. As will be appreciated based on the following description, the present embodiment is particularly suited for use with multiple streaming media servers because it prevents an unauthorized end user from accessing a content file on a particular media server by receiving access information from another end user authorized to access the same content file on a different media server. As illustrated in FIG. 9, the foregoing components are preferably in communication with each other via a secure network; however, in alternate embodiments, the global cache server 902 is directly coupled only to the streaming media servers 604, and the business server 904 is directly coupled only to the global cache server 902. As with the foregoing embodiments, end users access the secure content via end users processors 602-1, 602-2, 602-m (generically referred to as 602) coupled to the Internet or other network.

In general, the global cache server 902 caches connection information pertaining to each end user connection to a streaming media server 604 and provides an additional level of authentication protection based on end user ID. The connection information is stored either in local data storage, such as a cache or database, or in remote storage, such as database 608. As described in greater detail below, each streaming media server 604 forwards the connection information to the global cache server 902 for each end user access authorized that streaming media server 604. In the present embodiment, the connection information includes: end user ID; the global unique ID (GUID) of the end user's media player; the format of the streaming content to which the end user has been given access (e.g., Windows Media or RealPlayer format); the ID of the server on which the content being accessed by the end user resides; and an identifier (referred to as "ppv-slot") of the particular end user processor 602 from which the end user requested and is accessing the content. As is known, providers of media players typically assign each media player a GUID to identify the media player.

Each end user is logically assigned a number of end user processors 602 from which the end user can access content. In the present example, each end user may access content from up to three different end user processors 602. The three different processors may represent, for example, the end user's home computer; work computer; and either mobile computer, web-enabled cellular telephone or web-enabled personal digital assistant (PDA). Furthermore, on each of the three processors 602, the end user may have multiple media players, one for each media format supported by the system. In the present embodiment, Windows Media and RealPlayer formats are supported. Accordingly, in the present embodiment, each end user may have only up to three different ppv-slot values, and for each ppv-slot value, the end user may have two GUIDs, one for each type of format media player.

In the present embodiment, the ppv-slot value for a particular end user processor 602 is the cookie ID for that processor 602. In general, a cookie is a set of data that the web server 606 gives to the end user's browser the first time the end user visits the system website via a particular end user processor 602. The web server 606 saves the information the cookie contains about the end user, and the end user's browser stores the cookie, typically as a text file stored in the browser's system folder on the end user processor 602. In the event a user's processor 602 (e.g., web browser) does not accept cookies, the application will generate a response requesting the user change the options.

In the present embodiment, the ppv-slot information is stored in a transaction table in the database 608. In general, the transaction table associates an end user with a particular streaming media event and the three ppv-slots for the event. To this end, the transaction table includes the following fields: end user ID; event ID (which uniquely identifies a given media event); stream ID; date of the end user's access for the event; the first ppv-slot value; the GUIDs for the first ppv-slot; the second ppv-slot value; the GUIDs for the second ppv-slot; the third ppv-slot value; and the GUIDs for the third ppv-slot value. Based on the description herein, it will be understood that associating the end user and ppv-slot information with a particular event can be used to restrict each end user to no more than three end user processors 602 per event, while in alternate embodiments where the transaction database merely associates end users with ppv-slot information (across all events, rather than on an event-by-event basis), end users may be restricted to three end user processors 602 across all events.

As will be described in greater detail below, the business server 904 receives from the global cache server 902 all or a portion of the connection information, including the ppv-slot value. Like the global cache server 902, the business server 904 includes local or remote data storage and stores in a database a separate record for each unique set of connection information. Based on the connection information, an authorization application residing on the business server 904 limits an end user's access to three or less end user processors 602 and to a single media player for each of the three processors 602. The number of end user processors 602 (and thus the number of ppv-slot values) permitted is configurable in the authorization application of the business server 904.

While the additional levels of protection being described with reference to the present embodiment may be utilized in conjunction with the authentication system and methods of the foregoing embodiments, it is to be understood that any one or more of the additional levels of protection described in connection with the present embodiment may be implemented as the only authentication mechanism or may be implemented with authentication mechanisms other than those previously described herein. Thus, by way of example only, the additional levels of protection will now be described with reference to the work flow diagram of FIG. 10.

Initially, the web server 606 provides a web page to the end user that requests the end user to register for the service and log in to an authorization application. The web page also presents the end user with the option of viewing one of many streaming media files, each having a separate stream request link. Step 1002. In response, the end user provides the end user's user ID and activates the desired stream request link on the web page, thereby requesting access to a particular streaming media content file. The end user may also provide payment information, such as a credit card number or other account information. As with the foregoing embodiments, the provision of the end user ID and the activation of the stream request link may occur as a single step or as separate steps. When the end user logs in, an authentication application running on the web server 606, such as a Java script or other software script or component, checks the end user processor 602 for a ppv-slot cookie indicative of the end user previously logging into the system. If no cookie is present, the web server 606 assigns a cookie to the particular end user processor 602 and stores it on the end user processor 602, thereby identifying the processor 602. By activating the stream request link, the stream request link and the end user ID are communicated to the web server 606. Step 1004.

When the end user logs into the system and requests access to content, the web server 606 authentication application determines whether or not the end user has exceeded the allotted three ppv-slots and, if not, updates the transaction table. Step 1010*a*. In this regard, the web server 606 compares the cookie ID assigned when the end user logged into the system to all ppv-slot values in the transaction table for the particular end user (as identified by end user ID) and event (as identified by event ID). If the transaction table already includes three ppv-slot values and the received cookie ID fails to match any of the existing three ppv-slot values, then the end user is deemed to be attempting an unauthorized access from a forth processor 602 and the access is denied.

In the event the transaction table includes fewer than three ppv-slot values for the end user for the event, the web server 606 creates a record in a transaction table. More specifically, the web server 606 creates a record using the end user ID, the event ID (which was previously assigned to the content purchased by the end user), the stream ID of the purchased content (which the web server 606 retrieves from the database 608 as corresponding to the playlist ID of the stream request link), the date, and the ppv-slot value.

If the end user is not denied access based on ppv-slot information, upon receiving the stream request link and the end user ID, the authentication application running on the web server 606 accesses the database 608 (step 1006), receives the private key information from the database 608 (step 1008), generates the ticket and appends the ticket, end user ID and ppv-slot value to the stream request link (step 1010*b*). The authentication application running on the web server 606 then passes to the playlist server 610 the stream request link, including the appended ticket, end user ID and ppv-slot value. Step 1012.

Once the playlist server 610 receives the stream request link, ticket, end user ID and ppv-slot value, the playlist server 610 proceeds to generate the redirector file. As noted above, to generate the redirector file, the playlist server 610 accesses the database 608 (step 1014) and retrieves the Stream ID of the content file comprising the playlist, as well as the Hostname, URL prefix, and Filename, all of which are associated with the particular Stream ID (step 1016). With this information, the playlist server 610 creates the redirector file. Step 1018. The playlist server 610 then passes the redirector file to the particular media player at the end user processor 602, as identified by GUID. Step 1020. An exemplary redirector file for the present embodiment, where the URL Prefix is represented by "mms://"; the Hostname of the appropriate media server 604 is represented by "mediaserver.company.com"; the Filename is represented by "stream 1.asf"; the requested item of content Stream ID is represented by "123456"; the ticket is represented by "uvw123xyz"; the end user ID is represented by "abc123def"; and the ppv-slot value is "1," is as follows:

```
<ASX>
    <ENTRY>
        <REF href="mms://mediaserver.company.com/stream1.asf?ID=
            123456&TICKET=uvw123xyz& USER_ID=
            abc123def& PPV_SLOT=1">
    </ENTRY>
</ASX>
```

Having received the redirector file, the media player on the end user processor 602 proceeds to request the streaming media content from the appropriate streaming media server 604. Step 1022. More specifically, the media player makes a call to the particular streaming media server 604 as identified in the redirector file. When the call is made, the media player provides the streaming media server 604 with a copy of the requested content's Stream ID, the ticket generated by the web server 606 (in step 1010), the end user ID and the ppv-slot value. Furthermore, the media player passes to the streaming media server its GUID.

When receiving the original stream request and login information from the end user process 602, an application running on the streaming media server 604 determines whether or not the media player passed the GUID (or passed an invalid, default value). If not, the application causes the end user to be denied access by stopping the authentication process and notifies the end user. Preferably, the fact that the end user's media player did not provide the GUID is noted in the database 608, or other data storage, and the next time the end user logs into the system, the system provides the end user with instructions on how to enable the sending of the GUID.

As with the embodiment of FIGS. 6–8, once the streaming media server 604 receives the media player's call, the streaming media server 604 independently generates one or more authentication tickets and compares the one or more tickets to the ticket received from the media player. Step 1024. In the event the tickets "match," the streaming media server 604 allows access to the content and streams the content to the end user. Step 1026.

Each time a streaming server 604 provides an end user access to content, the streaming media server 604 sends the information identifying the particular connection to the global cache server 902. Step 1028. As noted above, such connection information preferably includes the end user ID, the format of the streaming content (e.g., Windows Media or Realplayer), the server ID of the streaming media server 604 providing the content to the end user, the GUID of the end user's media player, and the ppv-slot value representing the particular end user processor 602 from which the end user logged into the system.

Each time a streaming server 604 provides an end user access to content, the streaming media server 604 also locally caches the stream name or stream ID, end user ID, and connection information for the request. Whenever a stream connection is terminated, the streaming media server 604 removes the corresponding entry in its cache. As such, all entries in the cache represent current streams or accesses. Using a polling service running on the streaming media server 604, such as a software component or object, the media server 604 periodically (e.g., every two minutes) polls its cache for entries. For each entry, the streaming media server 604 resends the connection information to the global cache server 902.

As noted above, the global cache server 902 includes a database or cache, wherein each record contains received connection information. When the global cache server 902 receives connection information for a particular user, the server 902 typically creates a new record in its database. However, prior to creating a new record, the global cache server 902 first determines whether or not its database includes a record having the same end user ID as the newly received connection information. Step 1030.

The global cache server 902 also removes the record for a particular access when the access is terminated. As noted above, each streaming media server 604 resends to the global cache server 902 each set of connection information at predetermined intervals for the duration of the access identified by the connection information. The global cache server 902 periodically deletes records for which no connection information was resent, thereby maintaining a record for only current accesses. In alternate embodiments, the global cache server may delete records for connection no longer in use based on a different method. For example, in alternate embodiments, the global cache server 902 maintains the record for a particular connection until the global cache server receives a termination message from the streaming media server indicating that a particular connection has been terminated. In short, the existence of a record in the global cache server's database indicates that a particular end user (as identified by end user ID) is currently accessing a content file.

When the global cache server 902 already has a record with the same end user ID as that being received, the end user (or an unauthorized user who obtained access information) is attempting to access multiple content files at the same time or the same content file more than once. In the present embodiment, such multiple accesses are not allowed. Accordingly, the global cache server 902 issues a request to both the media server from which the newly received connection information is being received and to the media server that is identified by the server ID in the existing database record that the end user's access be terminated. Upon causing the streaming media servers 604 to disconnect the end user, the global cache server 902 removes form its database the record pertaining to the particular end user.

It is to be understood that this additional level of authorization protection is optional and may be implemented in different manners. For example, another server may query the global cache server 902 to determine whether a user is attempting multiple accesses. In one such embodiment, after the playlist server 610 receives the request link, ticket and end user ID from the web server 606, the playlist server 610 makes a call to the global cache server 902 to determine whether or not the global cache server 902 has a record of the end user already accessing content. Step 1018*a*. The global cache server 902 replies to the playlist server 610 with an indication as to whether or not the end user is currently accessing content. Step 1018*b*. In response, the authentication application running on the playlist server 610 generates a false or ineffectual redirector file. In one such embodiment, the redirector file is ineffectual due to the lack of a ticket or the inclusion of a default ticket that will be detected by the streaming media server 604.

In the event the global cache server 902 identifies no existing record in its database having the end user ID identical to that being received in the new connection information, the global cache server 902 creates a new record in its database with the received connection information and does not block the end user's access to the content.

If the global cache server 902 does not disconnect an end user, the server 902 relays all or a portion of the connection information to the business server 904, which effectuates two additional levels of optional authorization protection. Step 1034. In the present embodiment, the global cache server 902 relays the end user ID, ppv-slot, GUID, and stream format to the business server 904.

The business server 904 uses this connection information received from the global cache server 902 to control access to content based, in part, on the GUID of the media player. Step 1036. As noted above, each end user is permitted to log into the system and access content from three different end user processors 602, each having only one media player for each format. Accordingly, the business server 904 will cause an end user to be disconnected if the end user places a request for access using a particular media player (as identified by GUID), for a particular media format, on a particular end user processor 602 (as identified by ppv-slot) and that media player differs from the media player previously used on that same end user processor 602 for that same format media. In general, this determination is made by accessing the transaction table and comparing the newly received connection information with the existing entries for the end user and ppv-slot value.

When the business server 604 receives connection information for a given end user and ppv-slot, the business server 904 accesses the transaction table to determine whether or not a GUID has previously been received for this particular end user, ppv-slot and format. If not, the business server 904 causes the transaction table to be updated to reflect the GUID, and the business server 904 does nothing to terminate the end user's access.

In the event the received connection information corresponds to a record in the transaction table for which a GUID has already been received, the business server 904 determines whether or not the received GUID matches the GUID for the particular media format stored for that ppv-slot. If the GUIDs do not match, then the business server 904 sends an instruction to the global cache server 902 that the end user's access to the secure content be terminated, and the end user's access is denied. Such an instruction preferably specifies the end user ID. Step 1038. The global cache server 902, in turn, issues a request to the one or more streaming media server 604 currently providing content to the end user.

As such, even though the end user is temporarily given access to the content, the present embodiment should be considered to have denied access to the unauthorized end user. Such temporary access is allowed in the present embodiment because it is preferable not to delay providing access due to processing at the global cache server 902 and at the business server 904. In certain instances where access was delayed for the global cache server 902 and business server 904 processing, the end user's media player may time-out and prevent access from being granted. Consequently, the media server 604 of the present embodiment grants access upon the matching of tickets, thereby preventing the media player from timing-out, and such access is terminated in the event the global cache server 902 or the business server 904 determines the access was inappropriate.

In the event the business server 904 determines that the newly received media player GUID matches that stored in memory for the ppv-slot and format, then the business server 904 does nothing and allows the end user's access to continue.

It should be understood that while the global cache server 902 preferably receives connection information from all streaming media servers 904 in the system, it is possible to include multiple global cache servers, each of which receive connection information from a subset of the media servers. In such an embodiment, however, the multiple global cache servers are in communication with each other.

Furthermore, while the functionality of the global cache server 902 and the business server 904 may be combined into one server in certain embodiments, utilizing two separate servers has certain advantages, including scalability. For example, where the authorization system is utilized for multiple content owner accounts, each account may implement separate authorization rules, each on a separate business server having access to the global cache server. In such an embodiment, the connection information could be sent to the appropriate business server based on existing connection information or on an additional field contained in the connection information, such as account ID.

In the present embodiment, the system provides each end user with an opportunity to reregister and clear the end user's ppv-slot information (including ppv-slot values and GUIDs), thereby permitting the end user to access content from different machines and/or media players.

Other alternate embodiments control access to a playlist by carrying out the ticket authorization at the global cache server 902 as opposed to the media server 604. This can produce a more efficient system that has greater scalability. This is especially useful where there are numerous media servers that all serve similar content. Instead of saving and processing the exact same information on each media server, this embodiment allows the authentication information to reside on one central playlist, which can be passed along to the rest of the system. Thus, the media servers can focus on streaming the content and not be hampered by authentication algorithms. One such embodiment will now be described with reference to FIGS. 11–12. It will be understood by one skilled in the art that much of the functionality of the present embodiment is the same as that of the embodiment of FIG. 3, FIG. 6 and FIG. 9, as such, can be implemented by any of the same technologies. The architecture of the present embodiment is the same as the architecture discussed with reference to FIG. 9.

Figure 11:
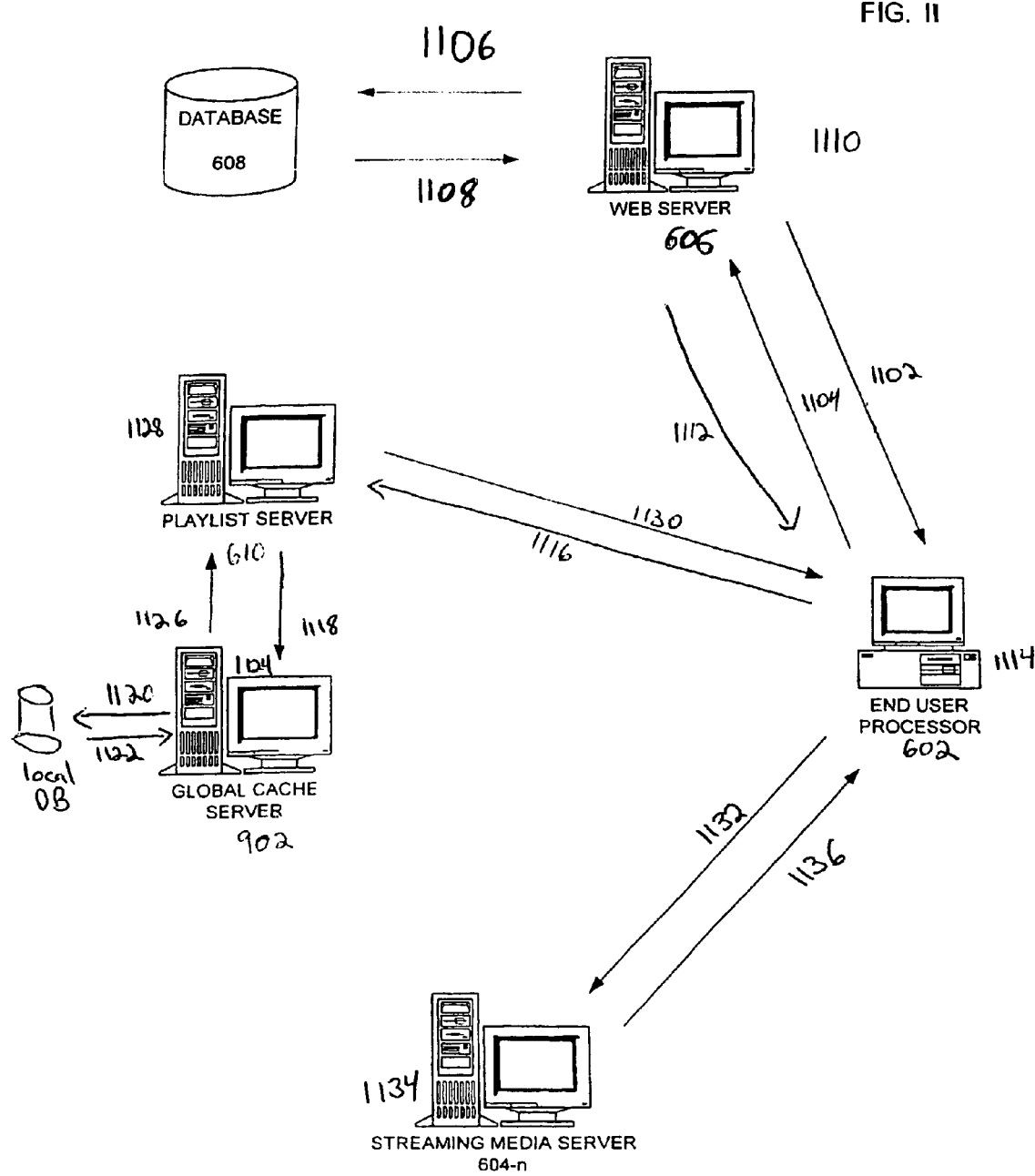
FIG. 11 is a schematic illustrating the workflow according to an alternate embodiment of the present invention.

The operation of the present embodiment will now be described with reference to the work flow diagram of FIG. 11. For purposes of the present example, the end user requests access to a playlist having one item of secure content although multiple items could be used. Initially, the web server 606 provides a web page requesting the end user to log in to an authorization application and presenting the end user with the option of viewing certain streaming media. Step 1102.

When the end user activates the stream request link, a programming script running on the end user processor 602 causes the stream request link and the end user ID to be sent to the web server 606. Step 1104. One skilled in the art will recognize that the end user script may be implemented in essentially any programming language, including, for example, C++, Perl, Visual Basic, Java and the like. In the present embodiment, the script is a Java script and is running in conjunction with the end user's web browser.

Once the web server 606 receives the stream request from the script, the web server 606, under the direction of an authorization software plug-in, generates the authorization ticket. In this regard, the web server 606 issues a request to the database 608 for the private key (in the present embodiment the security key and security interval associated with the requested playlist) for use in generating the authorization ticket. Step 1106. In response, the database 608 returns the private key to the web server 606. Step 1108. In other embodiments, private keys with greater, less, or different data may be used, and certain information, such as the security interval may be set in code rather than retrieved from memory.

Having obtained the private key from the database 608, the web server 606 generates the ticket as described above with reference to FIG. 4 using either the stream ID or the playlist ID. Step 1110. As described therein, the web server 606 applies the private key, stream ID or playlist ID, end user ID and the time values to a hash algorithm to generate the ticket. The web server then returns the ticket and the end user ID to the web browser running on the end user processor 602. Step 1112.

Having received the authorization ticket, the script running on the end user processor 602 appends the information to the end of stream request link. Step 1114. An exemplary link, wherein the playlist ID is represented by "789000,"the ticket is represented by "uvw123xyz," and the end user ID is represented by "abc123def," is as follows:
<A href "http://playlistserver.company.com/makeplaylist? ID=789000&TICKET=uvw123xyz return&USER_ID=abc123def">

The script running on the end user processor 602 then causes a call to be made to the playlist server 610, as identified in the stream request link by the Hostname "playlistserver.company.com." Step 1116. Accordingly, the playlist server 610 is provided with the link, playlist ID, ticket user Id and a cookie ID, which will be discussed in greater detail below.

In an alternate embodiment, no end user script is utilized to append the ticket to the stream request. Instead, when the end user provides its end user ID and activates the stream request link (in step 1104), the authentication application running on the web server 606 generates the ticket, appends the ticket and end user ID to the stream request link, and directly makes the call to the playlist server 610 to verify the ticket. Because the web server 606 also passes to the playlist server 610 information identifying the end user processor 602, the playlist server 610 forwards the playlist hash (as discussed below) to end user processor 602 (thereby obviating steps 1112, 1114 and 1116).

The playlist server 610 then passes the ticket generated by web server 606 along with a request to generate a second ticket to global cache server 902. Step 1118. The global cache server issues a request to its local database for the private key (in the present embodiment, the security key and security interval associated with the requested playlist) for use in generating the authorization ticket. Step 1120. It should be appreciated that an added benefit of having a local database is being able to access the information within the database without having to use different servers or other databases. Thus, the use of the local database provides quicker processing of the information stored in the database. In response to the request, the local database returns the private key to the global cache server 902. Step 1122.

Having obtained the private key from its local database, the global cache server 902, as described in greater detail below with reference to FIG. 11, determines whether or not to grant access by independently generating one or more authentication tickets and by comparing these tickets to the ticket generated by the web server 606. Step 1124. If a ticket generated by the global cache server 902 matches the ticket generated by the web server 606, the global cache server 902 sends a message to playlist server 610 indicating the match. If the tickets don't match a message is sent to playlist server 610 indicating the non-match. Step 1126.

If playlist server 610 receives a message indicating a match, playlist server 610 generates a playlist hash. This hash is based on the cookie ID for that processor 602. As was discussed above, in general, a cookie is a set of data that the web server 606 gives to the end user's browser the first time the end user visits one or more particular websites via a particular end user processor 602. The web server 606 saves the information the cookie contains about the end user (e.g., user ID), and the end user's browser stores the cookie, typically as a text file stored in the browser's system folder on the end user processor 602. This cookie is passed to the playlist server from the end user processor 602 along with the link, playlist ID, ticket, and user Id. In the event a user's processor 602 (e.g., web browser) does not accept cookies, the application will generate a response requesting the user change the options. This cookie, along with the current time and a predefined time interval, is used by playlist server 610 to generate a playlist hash. The generation of this hash will be discussed in greater detail below. If the tickets did not match, a "dummy hash" is created and appended to the stream. Step 1128. This "dummy hash" need not be based on the cookie but rather simply indicates to the system that the authorization has failed. As such, the dummy hash may be a predetermined alphanumeric or a randomly generated string, a hash based on a prior or future time, a null value, and the like. The hash, together with the stream request, and the authorization tickets are sent to end-user processor 602. Step 1130. Alternatively, one or both of the authorization tickets are not passed to the end user processor 602. In should also be appreciated that in certain embodiments no "dummy hash" is created and rather the stream request is sent to end-user processor 602 without any hash appended, thus indicating that authorization had failed.

It should also be understood that the playlist hash acts to identify a user as either having been granted authorization or denied authorization to view content. If the user has been authorized, a valid playlist hash will be generated. If the user has not been authorized, an invalid or "dummy" hash will be generated. In contrast, the authorization tickets that are generated form the basis of determining whether a user should or should not be granted authorization to view the content.

Having received the playlist hash, the end-user processor 602 proceeds to request the streaming media content from streaming media server 604. Step 1132. The end user processor 602 passes a copy of the stream id or playlist id as appropriate, the playlist hash, the authorization tickets, as well as the cookie. As was explained above, in certain embodiments, one or both of the authorization tickets are not passed from the playlist server 610 to the end user processor 602 and are thus not passed from the end user processor 602 to the streaming media server 604. Once the string is received, the streaming media server 604 verifies the accuracy of the playlist hash by generating a second hash value using the same hash algorithm that was used by the playlist server which utilized the current time, the received cookie and a predefined security time interval. Next the media server 604 compares the generated hash to the received hash. Step 1134. If the hash is verified (e.g., matches the generated hash) the content is served; if not, then access is denied since the hash is the "dummy hash" or the access has expired. Step 1136.

It should be appreciated that an added benefit of allowing the majority of the authentication to take place on the playlist server as opposed to the media server is the greater efficiency of the system. Being that there can be numerous media servers that all serve similar content, the exact same information that is saved and processed on the media servers can be found in various different places. Thus, allowing the media server to handle as little authentication as possible can save much memory space. Thus, the majority of the authentication information can reside on one central playlist server which can be passed along to the rest of the system. Additionally, allowing the media servers to focus on streaming the content produces a more efficient streaming of the content, as well.

Figure 12:
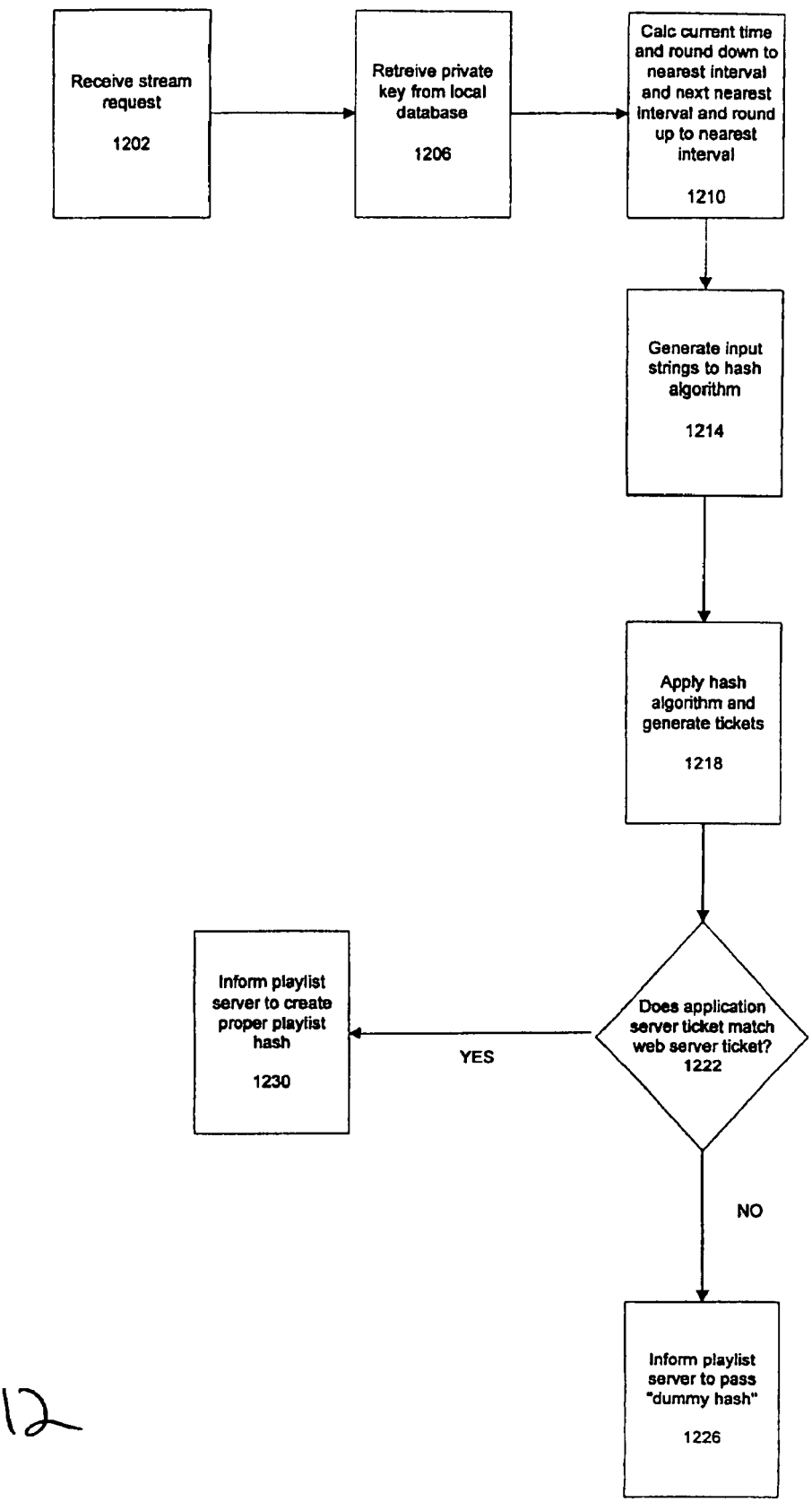
FIG. 12 is a flowchart illustrating the process of determining whether to provide access to a item of streaming media content according to an alternate embodiment of the present invention.

The process of the global cache server 902 determining whether to grant access to the requested content stream will now be discussed in greater detail with reference to FIG. 12. As will be appreciated, this process is similar to the process discussed above with reference to FIG. 5.

In determining whether to grant access, the global cache server 902 first receives the stream request, including the stream ID, end user ID, the public key, end user cookie and ticket, from playlist server 610. Step 1202. Once the stream request is received, the global cache server 902 generates the input string to the hash algorithm. In this regard, the global cache server 902 retrieves from its local memory, which may be a cache or local database, the private key information, namely the security key and security interval although other keys may be used. Step 1206.

As was discussed earlier with regard to media server 104, the global cache server 902 calculates three time values to account for the difference in time. Step 1210. The global cache server 902 at that time then uses the retrieved private key information, the received public key information and the three time values to generate three corresponding hash input strings. Step 1214. In the present embodiment the three time values are the current time, and the current time plus and minus the security time interval, for example, where the security interval is ten seconds prior to the current time and ten seconds after the current time. It should be appreciated that the smaller the difference between the time values the higher the level of security that is applied. Smaller time intervals lessen the possibility that a user can intercept a proper hash and attempt to pass it along as a proper authentication to improperly obtain the content because even a proper hash has a limited useful life span. The global cache server 902 then applies each of the three input strings to the hash algorithm, thereby generating three tickets. Step 1218.

Having independently generated the tickets, the global cache server 902 then determines whether any of the tickets generated by the global cache server 902 match the ticket as generated by the web server 606. Step 1222. If the tickets do not match, then it is likely that the stream request is not authentic and/or has expired (i.e., was generated by the global cache server 902 at a time outside of the security interval as measured from the time of the user's request). Accordingly, the global cache server passes a message to playlist server informing it of the authorization failure. Step 1226.

If the tickets do match, then it is likely that the stream request is both authentic and within the security time interval. The global cache server 902 then passes a message to playlist server 910 instructing playlist server 910 to generate a playlist hash. Step 1230. As was described above in connection with FIG. 11, this hash is passed along with the stream request to end-user processor 602 from where it is passed to the streaming media server 604 for verifying the accuracy of the hash.

Figure 5:
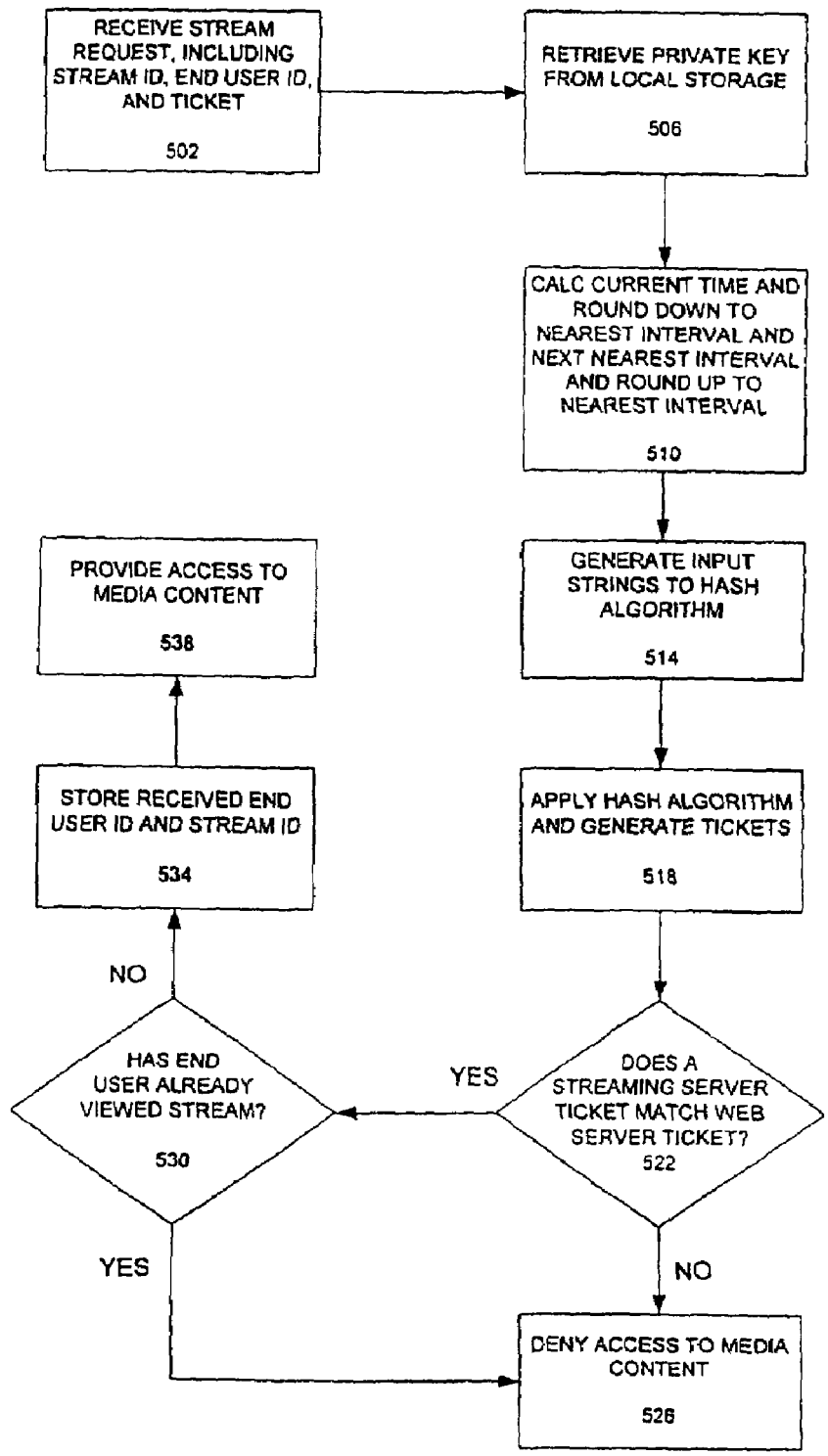
FIG. 5 is a flowchart illustrating the process of determining whether to provide access to a item of streaming media content according to one embodiment of the present invention.

Based on the description herein, those skilled in the art will understand that all of the various embodiments and modifications discussed with reference to FIG. 5 are also applicable to the present embodiment.

It is also to be understood that although the foregoing embodiments utilize a private key comprising both a security key and a security interval, it is within the scope of the present invention to utilize more or less information as the private key. For example, in alternate embodiments, no security key is used and in other embodiments, additional information is included in the private key, including, for example, a client's user name and password. Similarly, it is within the scope of the present invention to utilize a public key comprising information other than the stream ID and end user ID. For example, other content file identifying information may be used, including, for example, the file path name. Additionally, the end user ID may be omitted from the public key information in certain embodiments. In still other embodiments, the public key information includes additional information, such as the title or other stream detail of the request content file.

It is also to be understood that the functionality described as being provided by the web servers and the streaming media servers may be implemented on other devices associated therewith. For example, in certain embodiments of the present invention, the streaming media server has an associated application server coupled thereto, which implements all or part of the process of denying or granting access to content. Similarly, it is within the scope of the present invention to associate an application server with the web server to provide some or all of the functionality of the web server, including, for example, the process of generating the authorization ticket. As such, reference to a particular server is meant to include other associated servers or processors coupled to the referenced server.

It is also to be understood that the authorization tickets need not be generated at precise times. For example, the ticket as generated by the web server may be based on the time when the end user activates the stream request link, when the web server receives the private key information from the database, or any other time near the activation of the stream request. Similarly, the media server may generate authorization, for example, when the call is made from the media player, after the private key information is retrieved, or any other time near the time a call is made for the content. Furthermore, where the media server generates multiple tickets, the tickets may be based on different times or the same time. Accordingly, reference to time or the current time is meant to refer to a range and not a precise time.

Although the foregoing exemplary embodiments have been discussed in the context of controlling access to a single item of content, those skilled in the art will understand that any of the foregoing embodiments may be utilized to control access to a playlist comprising multiple secure content files. One exemplary embodiment for controlling access to a playlist will now be described with reference to the embodiment of FIGS. 6–8. Such an embodiment operates in accordance with foregoing description, with the modifications noted below. In general, the web server 606 generates a ticket for each content stream contained in the playlist based on each stream's stream ID.

The media player on the end user processor 602 passes the stream request, which includes the playlist ID, to the playlist processor 610. The playlist processor 610, in turn, generates the redirector file and returns the redirector file to the media player. The "imakeplaylist.dll" object uses the playlist ID, "789000" in the present example, to construct the appropriate redirector file. More specifically, the playlist server 610 accesses the Playlist Table 708 and the Playlist Streams Table 710 to determine which content files are part of the requested playlist and the order of the content files in the playlist. The content files' filenames are retrieved from the Streams Table 704. A script running on the end user processor 602 then appends the stream IDs, tickets and end user ID to the URL linking to the corresponding content stream. In the present embodiment, all content streams are located on the same media server 604, as identified in the Streams-Server Table 712.

An exemplary ASX redirector file, including the stream IDs, tickets and end user ID appended to the URL link for the corresponding content stream, is as follows:

```
<ASX>
    <ENTRY>
        <REF href="mms://mediaserver.company.com/stream1.asf?ID=123456&TICKET=abc111xyz&USER_ID=abc123def">
        <REF href="mms://mediaserver.company.com/stream2.asf?ID=234567&TICKET=def222xyz&USER_ID=abc123def">
        <REF href="mms://mediaserver.company.com/stream3.asf?ID=345678&TICKET=ghi333xyz&USER_ID=abc123def">
    </ENTRY>
</ASX>
```

The media player then makes a series of calls to the streaming media server 604, one for each of the URL links contained in the redirector file. More specifically, the media player first makes a call to the media server 604 for access to the first content stream (in the present example, having stream ID 123456). In response to the call and as generally described above with reference to FIG. 5, the media server 604 independently generates a ticket and determines whether to grant access to the content. If access is not granted, the end user is notified as such. On the other hand, if the media server grants the end user access to the first content stream, then the media player proceeds to makes calls to the media server 604 for the remaining content streams in the playlist. With each call, the media server 604 proceeds with authorizing or denying access to the requested content stream.

It should be understood that in such an embodiment, however, it is preferable for each content stream to have an individual security interval that accounts for the total duration of the content streams played prior to the stream in the playlist. For example, in a playlist containing three content streams, each of which is five minutes in duration (as identified in Stream Details fields of the Streams Table 704), the security interval for the second stream may be five minutes longer than that for the first stream, and the security interval for the third content stream may be ten minutes longer than the interval for the first stream. By accounting for the duration of each stream in the playlist, the system helps prevent an authorized end user from receiving access to the first content stream in the playlist but not to a subsequent content stream because the ticket has expired. The security intervals may also account for any non-secure content, such as advertisements, contained in the playlist.

Other alternate embodiments control access to a playlist containing multiple secure content streams by generating a ticket based on the playlist ID. One such an embodiment operates in accordance with the description of the system of FIGS. 6–8, with the modifications noted below. In general, once the end user logs in to the authorization application and requests access to a playlist, the web server 606 generates a ticket based on the playlist ID and returns the ticket to the end user processor 602. In response, a script running on the end user processor 602 appends the ticket and end user ID to the stream request link. The following is an illustrative stream request link having the public key information appended thereto, wherein the playlist ID represented by "789000"; the ticket is represented by "xyz321abc" and the end user ID is represented by "abc123def".

<A href "http://playlistserver.company.com/makeplaylist.dll?PLAYLIST_ID=789000&TICKET=xyz321abc&USER_ID=abc123def">

The end user processor 602 makes a call to the playlist server 610, as identified by the name "playlistserver.company.com". The playlist server 610, in turn, initiates the "makeplaylist.dll" object residing at the playlist server 610 in order to generate the redirector file. In the present embodiment, all content streams reside on the same media server 604. Unlike prior embodiments, the "makeplaylist.dll" object also appends to the end of the first URL link in the redirector file the filenames for the subsequent secure content streams in the playlist, and only the playlist ID and ticket is appended to each of the subsequent URL links. An exemplary ASX redirector file is as follows, wherein: the playlist includes three Windows Media format content files having the filenames represented by "stream1.asf", "stream2. asf" and "stream3. asf"; the playlist ID is represented by "789000"; the end user ID is represented by "abc123def"; and the ticket is represented by "xyz321abc":

```
<ASX>
    <ENTRY>
        <REF href="mms://mediaserver.company.com/stream1.asf?PLAYLIST_ID=789000&TICKET=xyz321abc&USER_ID=abc123def&STREAM=stream2.asf&STREAM=stream3.asf">
        <REF href="mms://mediaserver.company.com/stream2.asf?PLAYLIST_ID=789000&TICKET=xyz321abc">
```

-continued

```
<REF href="mms://mediaserver.company.com/
stream3.asf?PLAYLIST_ID=789000&TICKET=xyz321abc">
    </ENTRY>
</ASX>
```

The media player at the end user processor 602 proceeds to make a call to the mediaserver.company.com (i.e., the Hostname of the streaming media server 604) for access to the first content file. The media server 604 proceeds to generate a ticket based on the playlist ID and to grant or deny access as discussed above with regard to FIG. 5. If the media server 604 grants access to and provides the media player with the first content file in the playlist, the media server 604 creates a record in a locally stored table for the playlist ID and the corresponding ticket, and stores in the record the filenames of the subsequent content streams in the playlist, as contained in the redirector file.

When the media player subsequently calls for access to the second content stream, the media player provides the playlist ID and ticket to the media server 604. The media server 604, in turn, searches the table for the record identified by the playlist ID and ticket. If the record exists, the media server 604 provides access to the second stream and flags the stream as having been viewed by the end user with the particular ticket. If an unauthorized end user attempts to access the second stream using the same URL link, the media server 604 will deny access because in the record pertaining to the playlist ID and ticket, the second stream has been flagged as having been viewed. The same process is utilized for providing access to the remaining content streams in the playlist. As will be appreciated by one skilled in the art, this embodiment avoids any potential for incorrectly denying access to a subsequent stream in a playlist due to the time delay between granting access to the first stream and such subsequent stream.

Those skilled in the art also will recognize that the method and system of the present invention has many applications, may be implemented in many manners and, as such, is not to be limited by the foregoing exemplary embodiments and examples. Moreover, the scope of the present invention covers conventionally known and future developed variations and modifications to the system components described herein, as would be understood by those skilled in the art.

We claim:

1. A method for controlling access to a media file, the method comprising:
   generating a first authorization ticket at a first time in response to a request to access the media file from a user;
   generating a second authorization ticket at a second time;
   determining whether the first and the second authorization tickets match thereby determining whether the user is authorized to access the media file;
   generating a first hash at a third time, the first hash based upon the determining whether the authorization tickets match and upon data;
   generating a second hash at a fourth time, the second hash based upon the data;
   determining whether the first hash and the second hash match, wherein a match of the first and second hashes indicates the user as having been authorized; and
   permitting the user access to the media file if the first and second hashes match;

wherein:
   the first authorization ticket is generated on a web server;
   the second authorization ticket is generated and the determination whether the first and the second authorization tickets match are performed on a global cache server;
   the first hash is generated on a playlist server; and
   the generating of the second hash, the determining whether the first hash and the second hash match, and the permitting the user access to the media file are all performed on a media server.

2. The method of claim 1 wherein the permitting access includes permitting access to multiple media files.

3. The method of claim 1 wherein said generating a first hash at a third time further comprises setting the first hash to a value indicating that access is to be denied if the first and the second authorization tickets do not match, thereby indicating attempted unauthorized access.

4. The method of claim 1 wherein a first server generates the first hash and a second server permits the user access, the first server being different than the second server.

5. The method of claim 1 wherein a first server determines whether the first and second authorization tickets match, and a second server permits the user access, the first server being different than the second server.

6. The method of claim 1 wherein the request is received from a user's computer and wherein the data is a cookie on the user's computer.

7. The method of claim 1 wherein the data is a randomly generated string.

8. The method of claim 1 wherein the data is a null value.

9. The method of claim 1 wherein the data is a date.

10. The method of claim 9 wherein the date is a future date.

11. The method of claim 9 wherein the date is the present date.

12. The method of claim 9 wherein the date is a past date.

13. The method of claim 1 further comprising:
   generating a third authorization ticket at the second time; and
   comparing the first authorization ticket to each of the second and the third authorization tickets.

14. The method of claim 1 wherein the first authorization ticket and the second authorization ticket are based on a time.

15. The method of claim 14 wherein the time is a future time.

16. The method of claim 14 wherein the time is the present time.

17. The method of claim 14 wherein the time is a past time.

18. The method of claim 1 wherein the first authorization ticket and the second authorization ticket are based on a security key.

19. The method of claim 1 wherein the first authorization ticket and the second authorization ticket are based on an identifier for the media file.

20. The method of claim 1 wherein the first hash and the second hash are further based on a time.

21. The method of claim 20 wherein the time is a future time.

22. The method of claim 20 wherein the time is the present time.

23. The method of claim 20 wherein the time is a past time.

24. The method of claim 1 wherein the first hash and the second hash are further based on a security key.

25. The method of claim 1 wherein the first hash and the second hash are further based on an identifier for the media file.

26. The method of claim 1, wherein the web server, global cache server, playlist server and media server are the same server.

27. A method of claim 26, wherein the first one or more servers comprise one server.

28. A method of claim 26, wherein the second one or more servers comprise one server.

29. A method of claim 26, wherein a single service provider provides the first and second one or more servers.

30. The method of claim 1, wherein the web server, global cache server, playlist server and media server are different servers.

31. A method of claim 1, wherein a single service provider provides the web server, global cache server, playlist server and media server.

32. A system for controlling access to a media file, the system comprising one or more processors comprising a web server, global cache server having local memory, playlist server and media server operative with software to:
   generate a first authorization ticket at a first time in response to a request to access the media file;
   generate a second authorization ticket at a second time independently of the first authorization ticket and to determine whether to grant access to the media file by comparing the first authorization ticket and the second authorization ticket;
   generate a first hash based upon the determination of the second processor; and
   generate a second hash;
   determine whether to grant access to the media file by comparing the first hash and the second hash; and
   provide access to the media file, based on the comparing of the first hash and the second hash;
   wherein:
   the web server generates a first authorization ticket at a first time in response to a request to access the media file;
   the global cache server generates a second authorization ticket at a second time independently of the first authorization ticket and determines whether to grant access to the media file by comparing the first authorization ticket and the second authorization ticket;
   the playlist server generates a first hash based upon the determination of the second processor; and
   the media server determines whether to grant access to the media file by comparing the first hash and the second hash and provides access to the media file, based on the comparing of the first hash and the second hash.

33. The system of claim 32 wherein the controlling access is controlling access to multiple media files.

34. The system of claim 32, wherein the web server, global cache server, playlist server and media server are the same server.

35. The system of claim 32, wherein the web server, global cache server, playlist server and media server are different servers.

36. The system of claim 32, wherein a single service provider provides the web server, global cache server, playlist server and media server.

37. A method for controlling access to a media file, the method comprising:
   generating a first authorization ticket at a first time in response to a request to access the media file from a user;
   generating a second authorization ticket at a second time;
   determining whether the first and the second authorization tickets match thereby determining whether the user is authorized to access the media file;
   generating a first hash at a third time, the first hash based upon the determining whether the authorization tickets match and upon data;
   generating a second hash at a fourth time, the second hash based upon the data;
   determining whether the first hash and the second hash match, wherein a match of the first and second hashes indicates the user as having been authorized; and
   permitting the user access to the media file if the first and second hashes match;
   wherein:
   the first authorization ticket is generated on a first one or more servers;
   the second authorization ticket is generated and the determination whether the first and the second authorization tickets match are performed on the first one or more servers;
   the first hash is generated on the first one or more servers; and
   the generating of the second hash, the determining whether the first hash and the second hash match, and the permitting the user access to the media file are all performed on a second one or more servers.

* * * * *